United States Patent [19]

Thomsen et al.

[11] Patent Number: 4,838,964
[45] Date of Patent: Jun. 13, 1989

[54] PROCESS FOR PREPARING BELTS

[75] Inventors: Karl V. Thomsen, Ontario; John J. Darcy, Webster; Augustus W. Griswold, Rush; Boris W. Haritonoff, Geneseo; Jacob Pond, Rochester, all of N.Y.

[73] Assignee: Xerox Corporation, Stamford, Conn.

[21] Appl. No.: 231,629

[22] Filed: Aug. 8, 1988

Related U.S. Application Data

[63] Continuation of Ser. No. 28,807, Mar. 20, 1987, abandoned.

[51] Int. Cl.⁴ .................. B29C 53/42; B29C 65/74
[52] U.S. Cl. ................... 156/73.1; 156/137; 156/218; 156/285; 264/23; 264/161; 264/248
[58] Field of Search ............ 156/73.1, 73.3, 73.4, 156/73.5, 137, 138, 140, 142, 304.1, 304.5, 244.19, 218, 285; 264/23, 161, 248

[56] References Cited

U.S. PATENT DOCUMENTS

| | | | |
|---|---|---|---|
| 3,085,713 | 4/1963 | Reiners | 221/171 |
| 3,375,777 | 4/1968 | Techtmann et al. | 100/93 |
| 3,419,447 | 12/1968 | Hewitt | 156/515 |
| 3,459,610 | 8/1969 | Dijers et al. | 156/73 |
| 3,673,024 | 6/1972 | Eriksson | 156/137 |
| 3,754,425 | 8/1973 | Bindernagel et al. | 72/234 |
| 3,764,425 | 10/1973 | Neff et al. | 156/69 |
| 3,791,897 | 2/1974 | Mesly | 156/137 |
| 3,867,229 | 2/1975 | Marra | 156/417 |
| 3,879,256 | 4/1975 | Rust, Jr. | 156/580 |
| 3,939,033 | 2/1976 | Grgach et al. | 156/515 |
| 3,947,307 | 3/1976 | Buchscheidt | 156/73.1 |
| 3,994,767 | 11/1976 | Smith | 156/500 |
| 4,033,768 | 7/1977 | Wieloch | 96/1.5 |
| 4,042,655 | 8/1977 | Platt et al. | 264/25 |
| 4,078,961 | 3/1978 | Aoki et al. | 156/360 |
| 4,100,005 | 7/1978 | McNeal | 156/73.1 |
| 4,105,486 | 8/1978 | Cantarutti | 156/405 R |
| 4,173,314 | 11/1979 | Curran et al. | 242/58.4 |
| 4,220,491 | 9/1980 | Metcalf et al. | 156/286 |
| 4,222,811 | 9/1980 | Enders | 156/406 |
| 4,286,750 | 8/1981 | De Martino | 156/218 |
| 4,310,369 | 1/1982 | Miller et al. | 156/218 |
| 4,357,186 | 11/1982 | Calvert | 156/73.1 |
| 4,359,675 | 11/1982 | Miller, III | 318/603 |
| 4,411,721 | 10/1983 | Wishart | 156/73.1 |
| 4,434,019 | 2/1984 | Hollaway, Jr. | 156/137 |
| 4,465,536 | 8/1984 | Makino et al. | 156/133 |
| 4,519,857 | 5/1985 | Clay | 156/304 |
| 4,532,166 | 7/1985 | Thomsen et al. | 428/57 |
| 4,683,017 | 7/1987 | Figiel et al. | 156/73.1 |

FOREIGN PATENT DOCUMENTS 1184193  3/1970  United Kingdom ............... 156/137

Primary Examiner—Willard Hoag

[57] ABSTRACT

A process for fabricating belts are disclosed in which the leading edge of a web is conveyed from a supply roll into a belt loop forming station, the web is cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted trailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint.

13 Claims, 30 Drawing Sheets

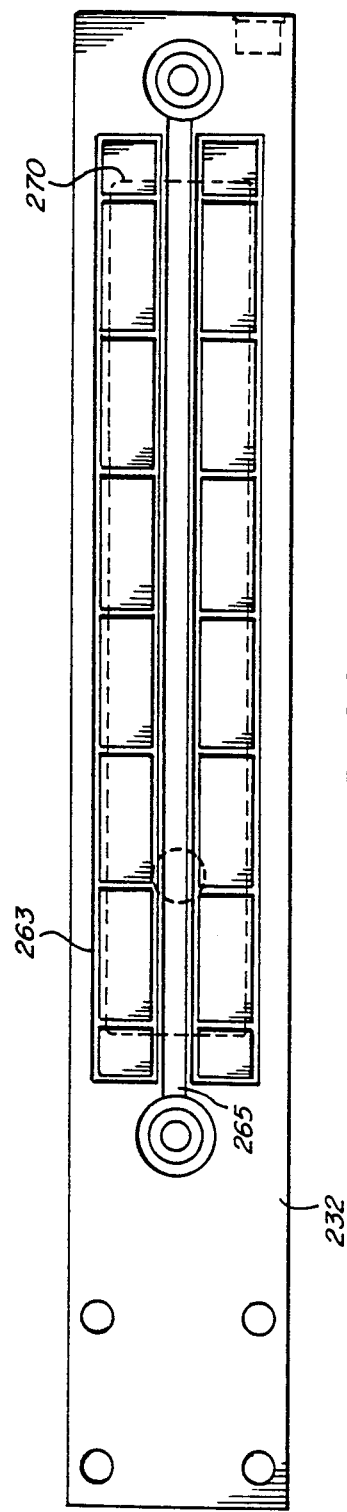

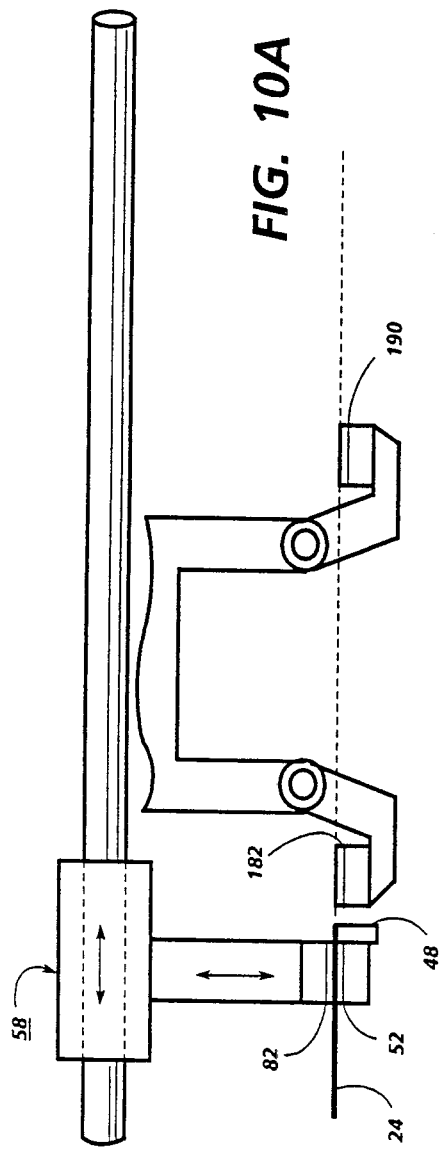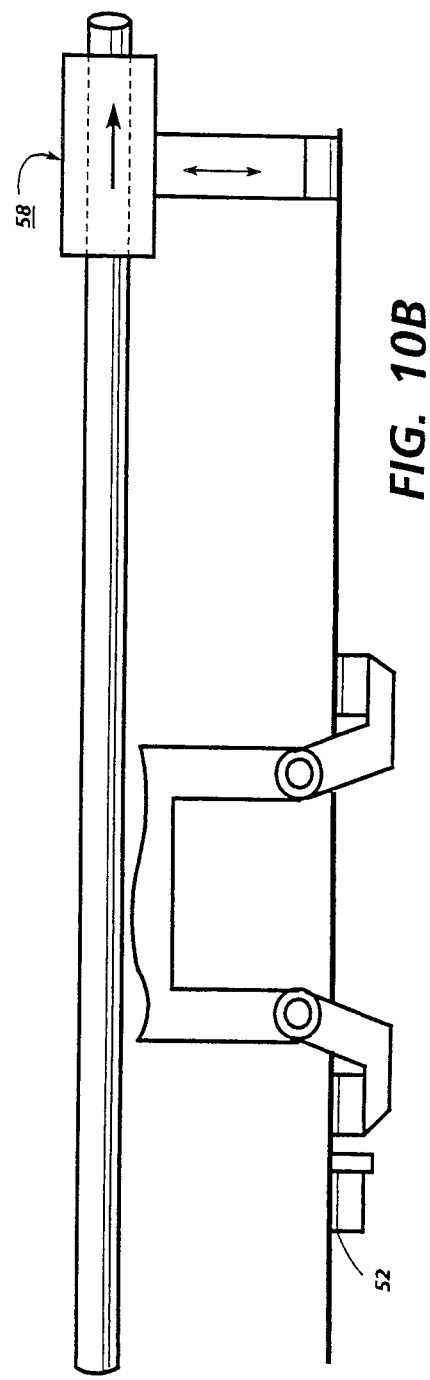

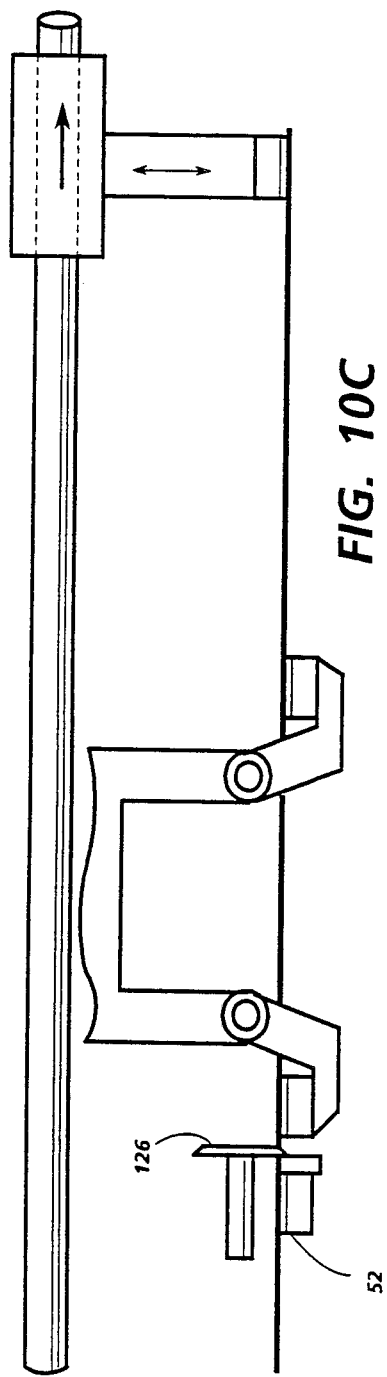
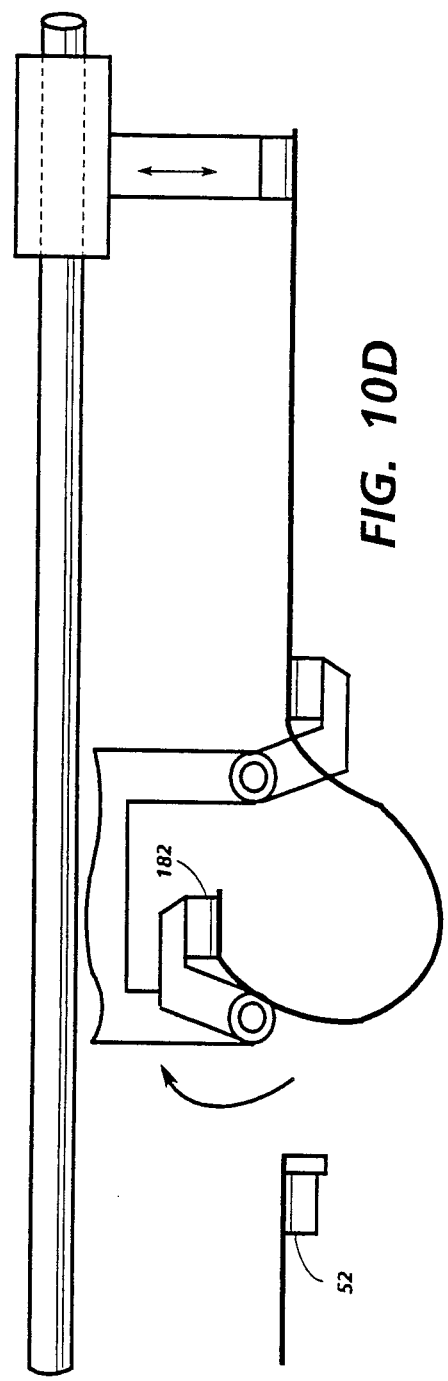

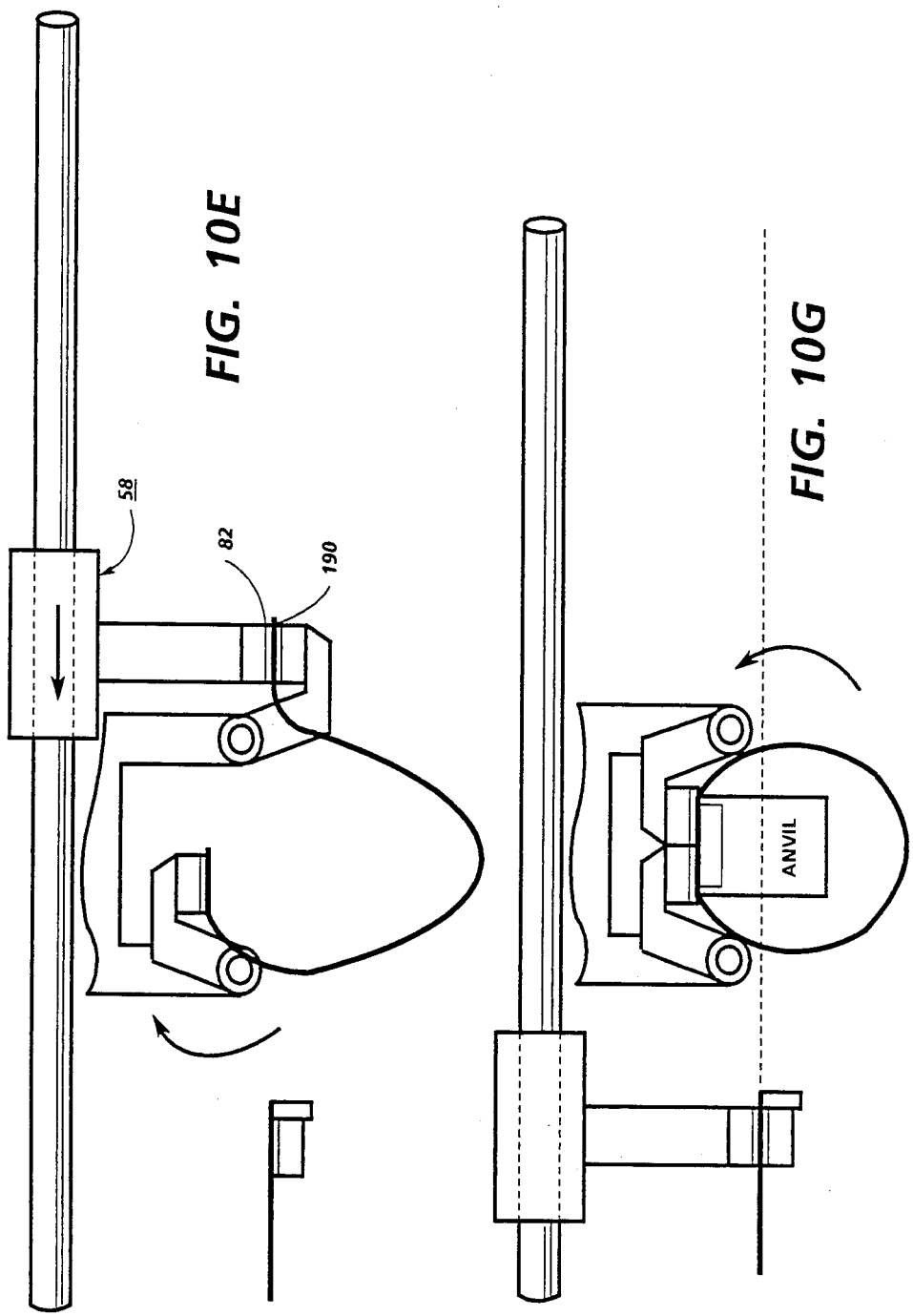

PROCESS FOR PREPARING BELTS

This is a continuation of application Ser. No. 028,807 filed Mar. 20, 1987, now abandoned.

BACKGROUND OF THE INVENTION

This invention relates in general to apparatus and processes for fabricating flexible belts.

Various techniques have been devised to form belts from webs. Thermoplastic webs may be joined by overlapping the edge of one web over another and placing the overlapped or seam portion of the webs over a base beneath a vibrating welding element. The vibrating welding element may be a horn vibrating at an ultrasonic frequency while it is brought into forced contact with one side of the overlapped webs while the other side of the overlapped web seam is supported on an anvil surface. Transfer of vibratory energy from the horn to the web material is effected upon impact of a suitably shaped surface of the horn on the seam of the web material. The vibrating energy causes surface heat to be generated between the overlapping webs along the area of contiguous contact between the webs. The horn normally resonates toward and away from the seam at a frequency of about 16 kHz or higher. The weld may be in the form of a chain of spots along the seam or a continuous weld. The technique of ultrasonic welding of thermoplastic material is well known and illustrated, for example, in U.S. Pat. No. 4,532,166, U.S. Pat. No. 3,879,256, U.S. Pat. No. 3,939,033, U.S. Pat. No. 3,947,307 and U.S. Pat. No. 3,459,610, all incorporated by reference herein in their entirety.

Unfortunately, batch processes for cutting and welding webs into belts require considerable time, duplicate manual handling, occupy excessive floor space and also require extensive equipment for alignment, cutting, welding trimming and other processing steps.

Further, excessive manual handling increases the likelihood of damage to sensitive substrates or coatings, particularly for coated substrates that must meet precise tolerance requirements such as flexible electrostatographic imaging members including photoreceptors for high speed electrostatographic copiers, duplicators, printers and the like. Scratches and even fingerprints on the vulnerable surfaces of a sensitive, flexible photoreceptor renders the photoreceptor unacceptable for most electrostatographic copiers, duplicators and printers.

In copending U.S. patent application Ser. No. 845,205 filed May 27, 1986 in the name of E. Swain et al, a process and apparatus are disclosed for fabricating belts in which a first cylindrical mandrel is conveyed to a wrapping station where the leading edge of a web from a web supply roll is supplied to the first cylindrical mandrel at the wrapping station. The leading edge on the first cylindrical mandrel is secured by means of a partial vacuum and the web is wrapped around the first cylindrical mandrel by rotating the first cylindrical mandrel for about one revolution. The web is the severed at the wrapping station to form a trailing edge which overlaps the leading edge of thew web to form a first belt having a seam. The first mandrel is conveyed to a welding station and a second mandrel is substantially simultaneously conveyed to the wrapping station. The second mandrel is wrapped with fresh web material from the web supply roll and the seam on the first belt on the first mandrel is substantially simultaneously welded to form a unitary belt. These welded belts may be automatically removed from the mandrels at a belt discharge station. Although this approach produces excellent welded belts, the cylindrical mandrels are complex, heavy, and time consuming and expensive to fabricate. Due to the size and weight, considerably system down time is experienced while changing the three mandrels when a belt having a different circumference and/or width is to be fabricated. Moreover, the web pick up means is cumbersome, heavy, and expensive to fabricate. In addition, the seam of welded electrophotographic imaging members can only be prepared with the leading edge of the web underlying the trailing edge. The lap joint of a welded photoreceptor is normally conveyed in a direction which allows cleaning devices such as cleaning blades to ride smoothly over the lap joint much like rain is allowed to flow downwardly over lapped shingles on a roof. Electrically conductive ground strips are normally provided on only one edge of a photoreceptor. Some electrostatographic copiers, duplicators and printers require the ground strip to be along one edge whereas other electrostatographic imaging devices require the ground strip to be along the opposite edge. The use of cylindrical mandrel device in the above described copending patent application is also less versatile in providing welded photoreceptor belts for different electrostatographic copiers, duplicators and printers because, relative to the location of a ground strip, some imaging devices require lap joints having the leading edge of the web over the trailing edge whereas other imaging devices require lap joints having the trailing edge of the web over the leading edge.

PRIOR ART STATEMENT

U.S. Pat. No. 4,357,186 to Calvert, issued Nov. 2, 1982- An apparatus is disclosed for forming carrying straps from a predetermined length of plastic strip. The device forms a loop from the strip by gripping the leading edge with a pair of jaws and rotating the jaws 360° with measured feeding of the remainder of the strip to form overlapping ends. A pivoting holding means straddles the overlapping ends and moves the assembled plastic loop to a station where the overlapping ends are sonically welded together. The resulting strap is then applied in an enveloping fashion to a group of articles.

U.S. Pat. No. 4,310,369 to Miller et al, issued Jan. 12, 1982- A device and a method are disclosed for constructing cylinders from a multiply flexible web. Various process functions are carried out upon the web within forming units (3) which are equally spaced on a carousel apparatus. The processing stages are: an infeed station A where the web is wrapped around a mandrel (32), a heating and sealing stage C, cooling stages D, E and F, and a stripper/removal stage G.

U.S. Pat. No. 4,220,491 to Metcalf et al, issued Sept. 2, 1980-A device and process are disclosed for bonding two sheets together in controlled registry. The apparatus utilizes a pair of hinged sheet-receiving platens which possess vacuum means for retaining a sheet in a desired manner. The platens have indexing means which position the sheets prior to bond formation.

U.S. Pat. No. 4,411,721 to Wishart, issued Oct. 25, 1983 - A device and process are disclosed in which a fastener tape is automatically applied to a substrate. A pair of ultrasonic welding devices (22, 24) are provided at a work station (20). The handling of material within the machine is carried out by a system of pneumatic cylinders, pinch rollers and vacuum pads.

U.S. Pat. No. 4,532,166 to Thomsen et al, issued July 30, 1985 - A welded belt is disclosed which may be prepared, for example, by ultrasonically welding the overlapping ends of a web comprising thermoplastic materials.

U.S. Pat. No. 4,033,768 to Weiloch, issued July 5, 1977 - A method is disclosed for preparing belts for an electrophotographic copying device. The method comprises applying a film of soluble material over a mandrel, applying a photoconductive layer, heat treating the photoconductive layer, applying a conductive material layer, applying a seamless heat shrinkable film of resin, removing the layered belt from the mandrel, dissolving the film of soluble material with a solvent, and turning the belt inside out. The belt may be trimmed to the desired width.

U.S. Pat. No. 3,673,024 to Ericksson, issued June 27, 1972 - Apparatus and a method are disclosed for manufacturing belts. The method comprises winding fibrous webs over a pair of spaced rollers (column 1) and then heat treating the materials to adhere adjacent fibres to each other. An additional step of edge trimming is also disclosed.

U.S. Pat. No. 4,042,655 to Platt et al, issued Aug. 16, 1977 - A method is disclosed for producing a nonwoven fabric, including the steps of drafting the fabric in a drafting zone having nip rolls, fusing a portion of the fibres in the fabric after drafting, and needling the drafted batt.

U.S. Pat. No. 4,078,961 to Aoki et al, issued Mar. 14, 1978 - Apparatus and a method are disclosed for continuous supply of plastic film strip to a printing machine. The apparatus comprises a strip winding means, a switching means, strip cutting means and a heat-sealing means.

U.S. Pat. No. 4,173,314 to Curren et al, issued Nov. 5, 1979 -Apparatus is disclosed for providing a continuous supply of web material to a web printer. The web material is fed from a first roll supported in a feed position, and when the first roll is near depletion, the leading end of a second roll is adhesively connected to the web of the first roll with that web then being severed.

When multiply batch handling techniques are utilized to to fabricate belts, it is also often difficult to achieve uniform belt conicity and uniform quality. Moreover, because of differences in belt size requirements for different electrostatographic copiers, duplicators, printers and the like, a machine suitable for fabricating a belt of one diameter or width cannot be readily used to prepare a belt of a different diameter or width without encountering delays and expense. Further, lap joints formed with the leading edge over the trailing edge cannot be readily changed with the trailing edge over the leading edge for new batches where one side of a belt differs from the other side.

Thus, the characteristics of belt fabrication system exhibit deficiencies for rapidly manufacturing belts meeting precise tolerances and varying size and lap joint requirements.

SUMMARY OF THE INVENTION

It is an object of the invention to overcome the above-noted deficiencies by providing a process and apparatus for fabricating belts in which the leading edge of a web is conveyed from a supply roll into a belt loop forming station, the web is cut a predetermined distance from the leading edge to form a web segment having the leading edge at one end and a trailing edge at the opposite end, the lower surface of the web adjacent the leading edge is inverted, the lower surface of the web adjacent the trailing edge is inverted, the inverted leading edge and the inverted tailing edge are overlapped to form a loop of the web segment loosely suspended from the joint formed by the overlapped leading edge and trailing edge, the loop of the web segment at the belt loop forming station is transferred to an anvil, the loop of the web segment on the anvil is conveyed to a welding station and the overlapped leading edge and trailing edge are welded together on the anvil to form a belt welded at the joint. This welded belt may be automatically removed from the anvil at a belt discharge station.

The flexible belts may be rapidly prepared without attendant problems caused by manual handling. Further, because of the uniform shape achieved, the flexible belts prepared by the apparatus and processes of this invention are particularly useful for applications such as electrostatographic photoreceptors utilizing sensitive organic layers supplied in the form of long webs, especially long webs having an electrically conductive ground strip on one edge. In addition, precise control of the dimensions of the photoreceptors allows rapid changes in size for different production runs to fabricate belts of different diameters or different widths.

BRIEF DESCRIPTION OF THE DRAWINGS

A more complete understanding of the process and apparatus of the present invention can be obtained by reference to the accompanying drawings wherein:

FIG. 9A is a schematic, sectional plan view of an anvil.

FIGS. 10A through 10G are simplified schematic, sectional views in elevation of a belt loop shaping assembly during different stages of the belt forming operation.

DESCRIPTION OF THE PREFERRED EMBODIMENTS

Figure 1:
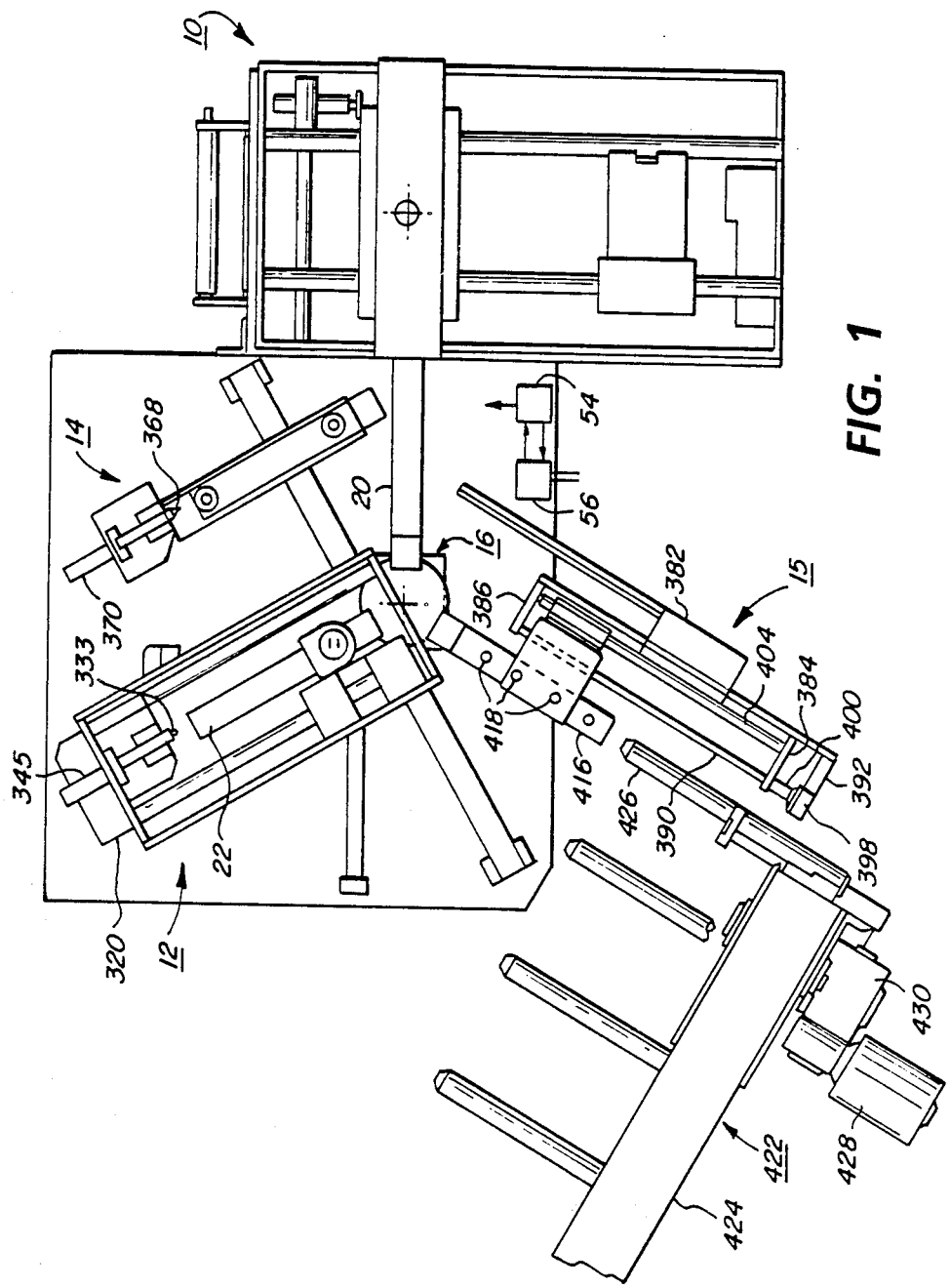
FIG. 1 is a schematic, plan view showing apparatus with four processing stations for fabricating belts from a web.

Referring to FIG. 1, processing stations for fabricating belts from a web are disclosed. These processing stations comprise belt loop forming station 10, belt welding station 12, belt notching station 14, and belt discharge station 15. These stations are serviced by rotation and reciprocateable belt conveying system 16 comprising belt conveying anvils 18,20 and 22.

Figure 2:
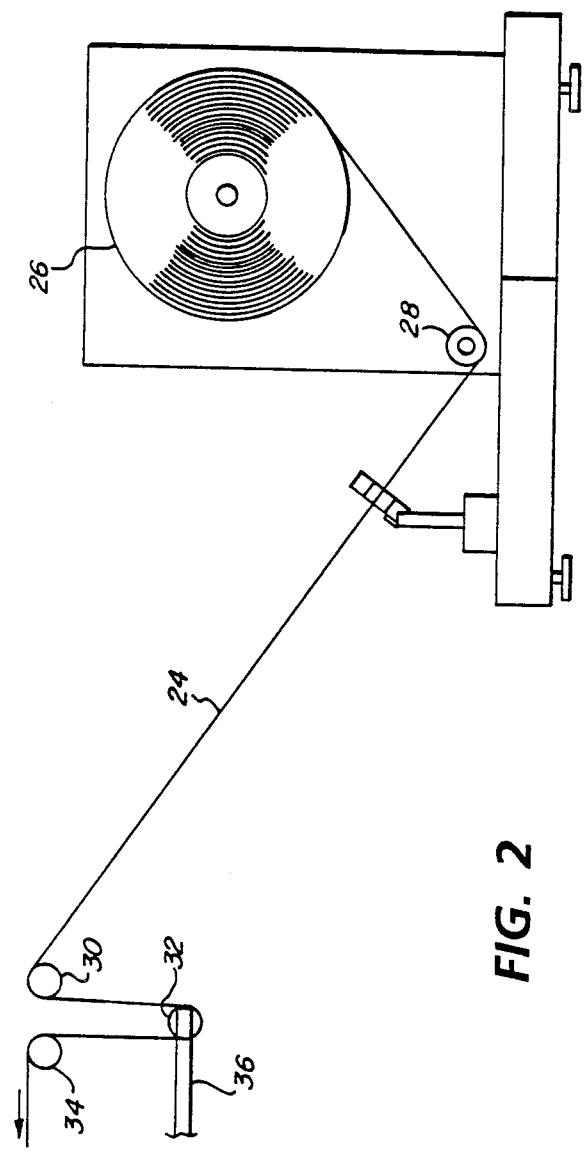
FIG. 2 is a schematic, sectional view in elevation of web supply and feed apparatus.
Figure 3:
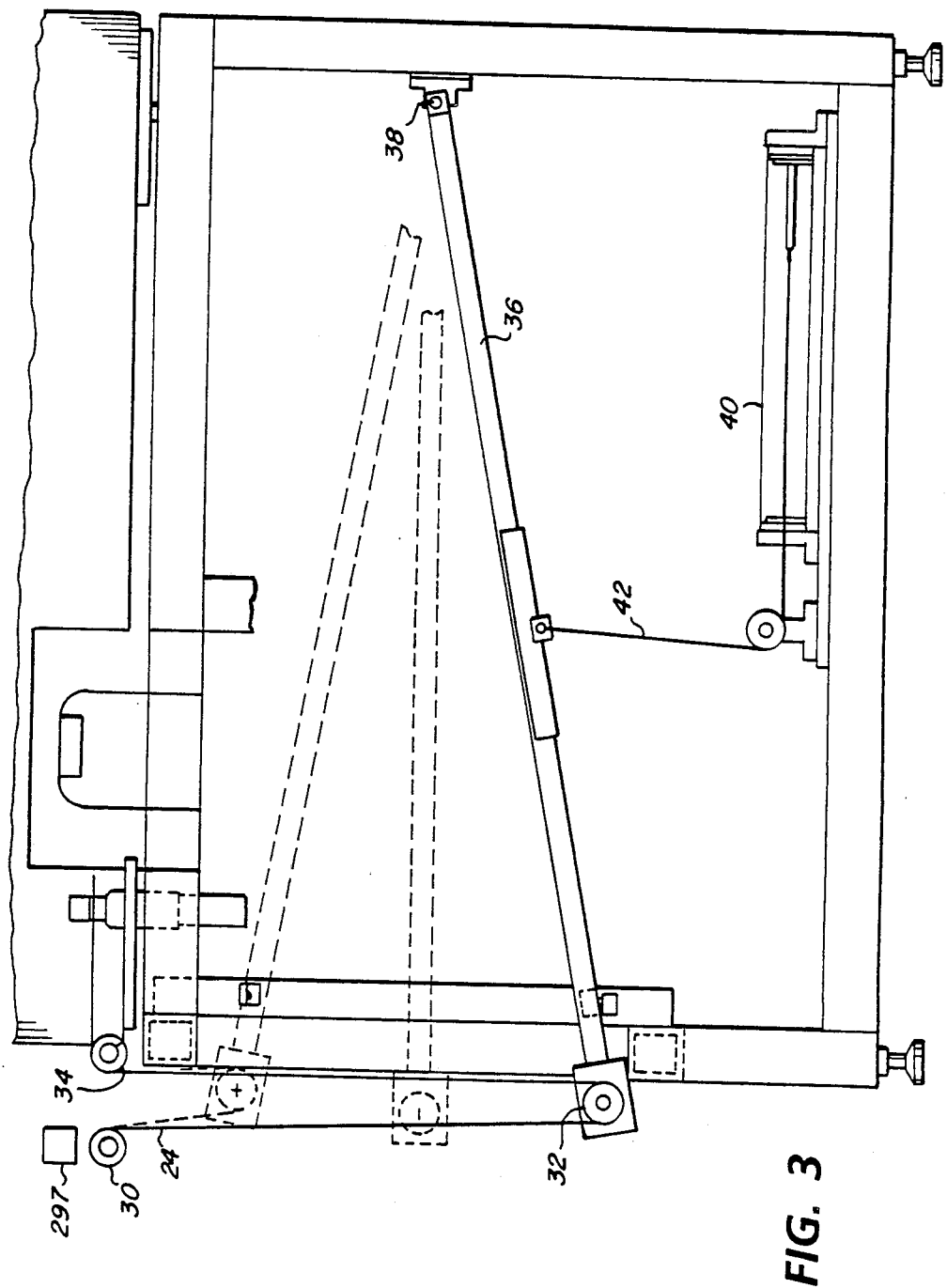
FIG. 3 is a schematic, sectional view in elevation of dancer roll apparatus.

As shown in FIGS. 1, 2 and 3, web 24, such as a thin coated or uncoated thermoplastic web, is supplied by a supply roll 26 and fed around guide roll 28, air bearing 30, dancer roll 32 and air bearing 34. Air bearing 30 and 34 and dancer roll 32 each contain a hollow annular chamber (not shown) and a porous outer shell of metal particles. Air bearings are particularly desirable where the web is a photoreceptor having an abrasion sensitive surface facing downwardly as the web is removed from the roll. Dancer roll 32 is supported by hollow idler arm 36 which is supported by and pivots around stationary shaft 38. Slack in the web 24 is taken up by downward pressure applied to idler arm 36 by pneumatic cylinder 40 through connecting cable 42. If desired, supply roll 26 may be fitted with a suitable adjustable brake or drag (not shown) to regulate the amount of tension employed to pull web 24 from supply roll 26.

Figure 4:
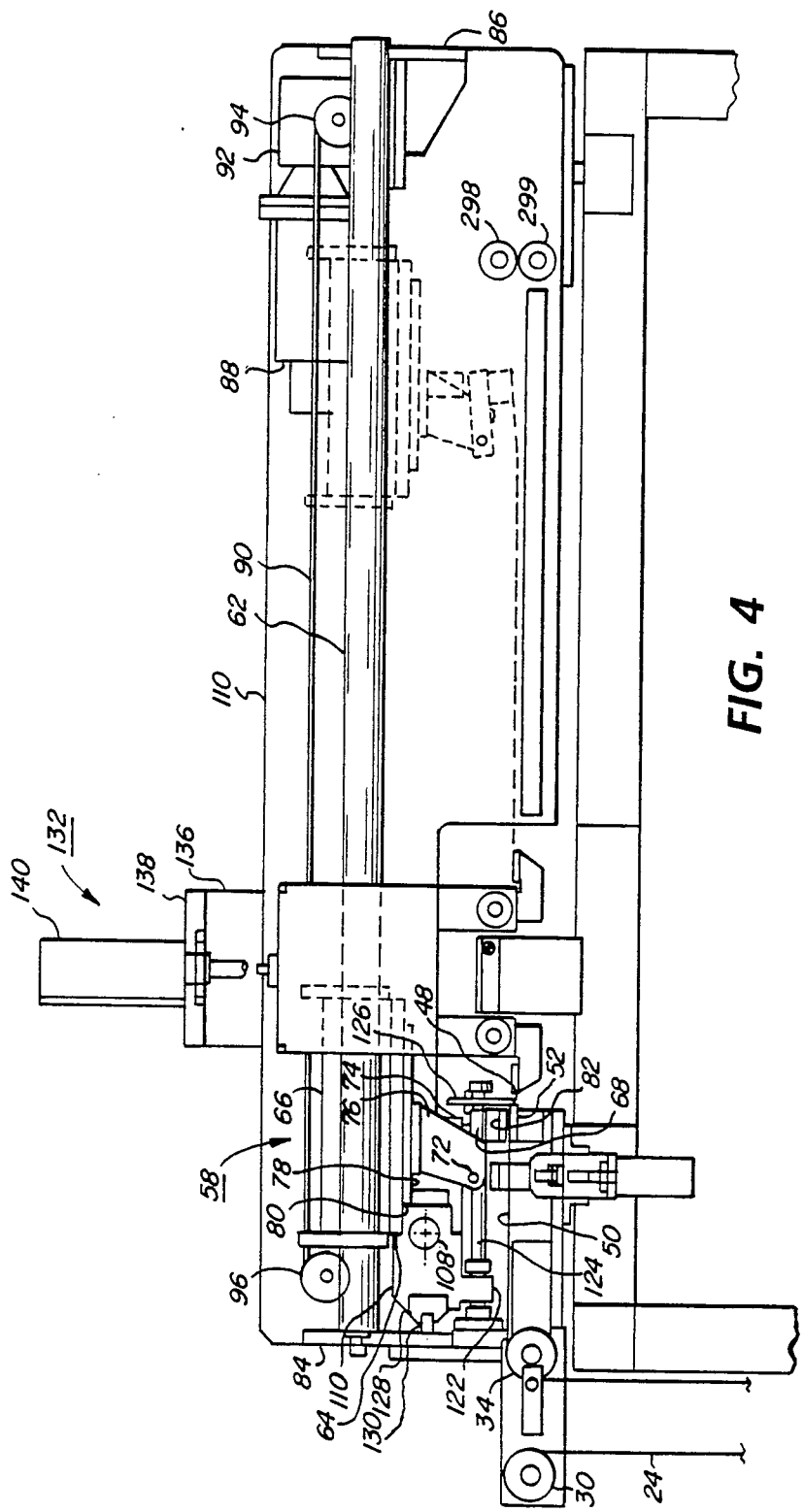
FIG. 4 is a schematic, sectional view in elevation of a web loop forming station.
Figure 5:
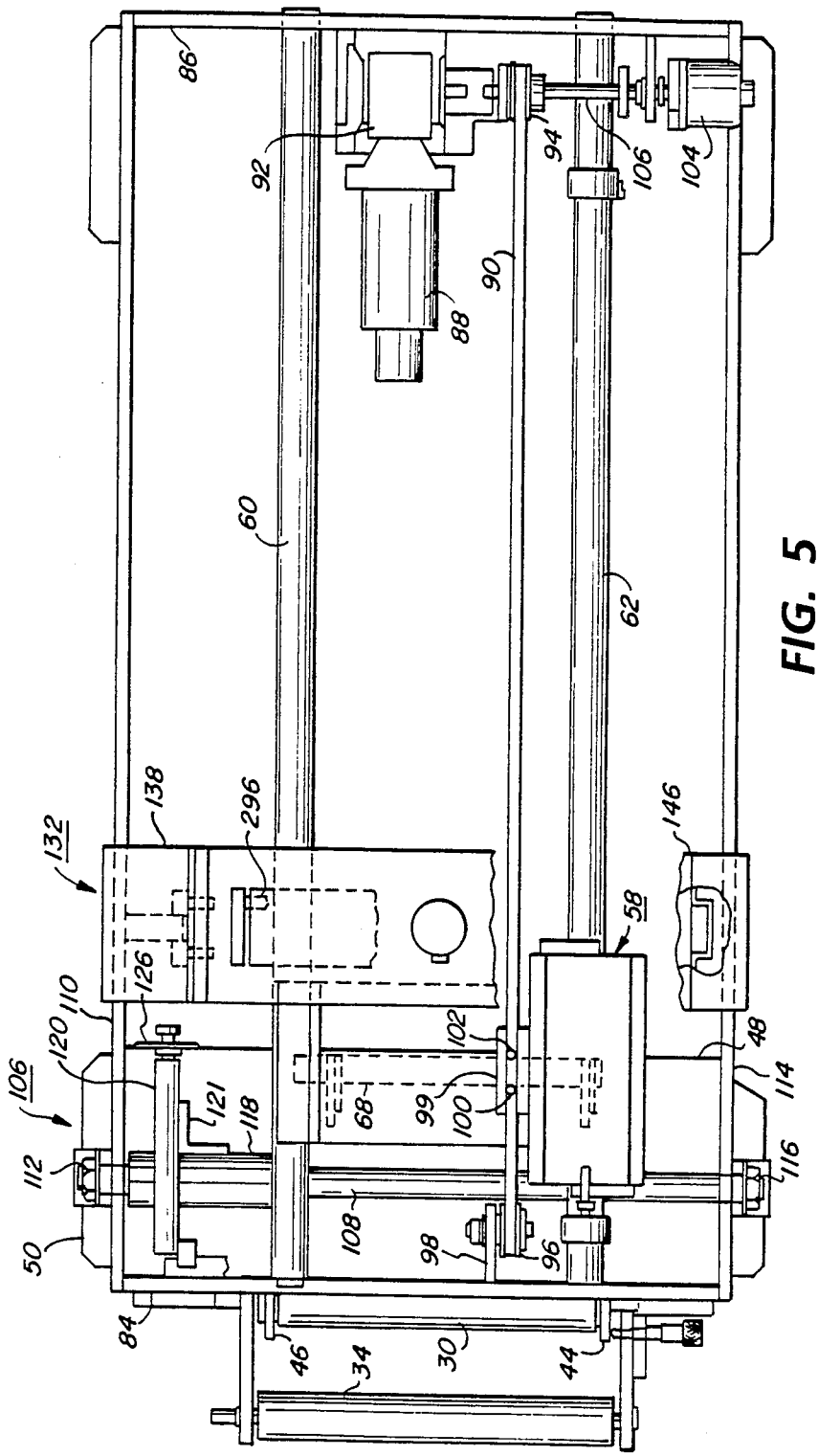
FIG. 5 is a schematic, sectional plan view of a web loop forming station.

The belt loop forming station 10 is shown in greater detail in FIGS. 3,4 and 5. The web 24 supplied by supply roll 26 is passed around stationary air bearings 30 and 32. Air bearings 30 and 34 and dancer roll 32 comprise hollow annular chambers (not shown) within a porous outer shell such as a shell of sintered metal particles. Air under pressure from a suitable source is fed through conventional hoses (not shown) to the hollow annular chambers of dancer roll 32 (through hollow idler arm 36), air bearing 30 and air bearing 34 and allowed to escape through the porous shell to provide an air bearing which prevents damaging contact with the surface of web 24 and reduces friction that must be overcome to pull the web 24 from the supply roll 26. Moreover, the "S" shape of the path of web 24 around air bearings 30 and 34 imparts sufficient lateral strength to web 24 to allow edge guides 44 and 46 to laterally position the web 24 without buckling as it travels through belt loop forming station 10. If desired, the "S" shaped path may be extended to provide a longer serpentine path for web 24. The dancer roll 32 and air bearing 30 and 34 are commercially available in the form of a porous metal tube, e.g. from Mott Metallurgical Corporation, Farminton Connecticut.

With reference to FIGS. 4 and 5, the leading edge of web 24 is initially fed to the cutting edge 48 of web receiving platform 50 and held against web receiving platform 50 by a partial vacuum provided by vacuum shoe 52 which is connected through an underlying vacuum plenum (not shown) to a suitable vacuum source (not shown). Any suitable vacuum show may be utilized. Typical vacuum shoes comprise one or more rows of holes of any suitable shape over a vacuum plenum, one or more rows of shallow grooves of any suitable shape connected by passages to an underlying vacuum plenum, a porous member of sintered particles over a vacuum plenum, and the like. The creation and removal of a vacuum in vacuum show 52 may be accomplished by activating a suitable solenoid operated valve in valve and switch cluster 54 (see FIG. 1). Valve and switch cluster 54 also includes other suitable valve and electrical switch actuators for the various pneumatic cylinders, motors and the like in the station subassemblies. The valves in valve and switch cluster 54 are conventional solenoid operated valves which are commercially available, for example from Mac Valves, Inc., Wixom, Mich. Positive pressure, a vacuum or ambient air pressure may be supplied from any suitable conventional source by suitable means such as ordinary air coupling lines (not shown). The expression "vacuum" as employed herein is intended to mean a partial vacuum rather than a complete vacuum. Similarly, electrical power to drive electrical equipment such as motors, solenoids, servomotors and the like are supplied through suitable wiring and conventional suitable electrical switching. The valve and switches are usually actuated through suitable circuitry in response to a signal from a programmable controller 56 (see FIG. 1). Expressions such as "activation", "supplying power", "inactivation" and the like are well known terms intended to include opening or closing solenoid operated valves or electrical switches to provide or discontinue providing positive pressure, a vacuum, ambient air pressure,electricity an the like. Thus, the control functions in the apparatus of this invention are synchronized and integrated with a suitable programmable controller 56 such as a Allen Bradley Programmable Controller, Model No. 2/05 or Model No. 2/17. The programmable controller responds to various typical inputs including, for example, inputs from limit switches, timers, encoders, proximity sensors, counters and the like and utilizes these inputs for sequencing program outputs to activate electric switches, solenoid operated valves that either vent a vacuum show, such as vacuum shoe 52, to the ambient atmosphere or connect the vacuum shoe to an evacuated chamber (not shown), and the like. Termination of an activated component may be effected by any suitable and conventional means such as by programmable controller 56 or by suitable limit switches.

As further illustrated in FIGS. 4 and 5, reciprocating web pick up assembly 58 is mounted above web receiving platform 50 and web 24 and is supported on a pair of guide rods 60 and 62. Web pick up assembly 58 comprises a platform 64, one side of which is slideably supported on guide rod 60 by cam follower rollers (not shown) and the other side being slideably supported on guide rod 62 by bearing block 66. Any suitable slide support system such as for example, a Thomson slide available, for example, from Thomson Industries, Manhasset, N.Y. may be employed. Web pick up assembly 58 also comprises pivotable plate 68 which pivots on shaft 72 when solenoid 74 is activated. Activation of solenoid 74 is effected by programmable controller 56 which supplies electrical power through conventional wiring (not shown). Shaft 72 is supported by a pair of end plates 76 which are fastened to plates 78 and 80. Plate 80 is supported by platform 64. A vacuum shoe 82 is mounted on the bottom of the free swinging end of pivotable plate 68. Pivotable plate 68 and vacuum shoe 82 extend transversely across substantially the entire width of web 24. The length of vacuum shoe 82 is normally slightly shorter than the width of web 24. Any suitable vacuum shoe, such as a shoe similar to the previously described vacuum shoe 52, may be utilized. The creation and removal of a vacuum in a vacuum plenum (not shown) overlying vacuum shoe 52 is accomplished by programmable controller 56 which controls suitable conventional solenoid activated valves which either connect vacuum plenum to an evacuated chamber or vent the vacuum plenum to the ambient atmosphere. The guide rods 60 and 62 are supported by end plates 84 and 86. Reciprocation of web pick up assembly 58 between a home position (shown on the left in FIGS. 4 and 5), an advanced intermediate shear position (illustrated with phantom lines in FIG. 4) and other locations on guide rods 60 and 62 is effected with the air of servomotor 88 which drives timing and drive belt 90 through gear box 92 and drive pulley 94. The home position of web pick up assembly 58 aligns vacuum shoe 82 directly over vacuum shoe 52 so that vacuum shoe may accept transfer of the leading edge of belt 24 after belt 24 is served. Drive belt 90 is supported at one end by drive pulley 94 and at the other end by idler puller 96. Idler pulley 96 is supported by flange 98 which is welded to end plate 84. A flange 99 mounted to bearing block 66 is fastened to timing and drive belt 90 by rivets 100 and 102. Thus, reciprocal movement of timing and drive belt 90 causes web pick up assembly 58 to reciprocate accordingly on guide rods 60 and 62. In addition to driving pulley 94, servomotor 88 also drives encoder 104 by means of shaft 106. Encoder 104 is electrically connected to programmable controller 56 by suitable wiring (not shown) to supply electrical signals to the programmable controller 56 indicating the relative location of web pick up assembly 58. Any suitable encoder may be employed. A typical encoder is an Allen Bradley Encoder, Model No. 845N-SJD-NY-CRYI available from Allen Bradley. The movement of web pick up assembly 58 is accomplished by programmable controller 56 which controls the starting, stopping and reversal servomotor 88. Generally, the spacing of vacuum shoe 82 from cutting edge 48 is determined by merely inputting suitable instructions into programmable controller 56 to achieve the degree of belt overlap desired in the final belt loop seam. However, although less desirable, other suitable means may be used instead of or in combination with spacing of vacuum shoe 82 from cutting edge 48 to achieve the desired amount of belt overlap in the belt loop seam.

Also shown in FIGS. 4 and 5 is a web cutter assembly 106 comprising hollow nonmagnetic shaft 108 secured at one end to side plate 110 by nut 112 and at the other end to side plate 114 by nut 116. Contained within hollow nonmagnetic shaft 108 is a slidable magnet piston (not shown) which is driven back and forth along the length of hollow nonmagnetic shaft 108 by compressed air alternately introduced at each end of hollow nonmagnetic shaft 108 through suitable fittings (not shown). Slideably mounted on hollow nonmagnetic shaft 108 is a magnetic bearing block 118. As the slidable magnet piston is driven back and forth in hollow nonmagnetic shaft 108 by compressed gas, the attractive magnetic force from the magnet piston attracts the magnetic bearing block 118 and causes magnetic bearing block 118 to slide back and forth on hollow nonmagnetic shaft 108 in unison with the magnet piston. A magnetic reciprocating drive system of the type illustrated is available, for example, from Festo Corporation, Hauppauge, N.Y. Any other suitable reciprocating drive means may be substituted for the magnetic device. Typical reciprocating drive means include ball and lead screw, pneumatic piston, servomotor, and the like. Support plate 120 angle iron 121 and magnetic bearing block 118 are welded together to form a rigid unitary assembly. The bottom of support plate 120 carries a pair of bearing blocks, one designated by the reference number 122 and the other not shown. These bearing blocks support a freely rotatable shaft 124 which carries a disc shaped cutting blade 126. Support plate 120 also carries a bifurcated bearing block 128 which rides on guide rail 130. Guide rail 130 is welded to end plate 84. Bifurcated bearing block 128 aids in the stabilization and alignment of disc shaped cutting blade 126 as it is reciprocated back and forth along cutting edge 48 of web receiving platform 50 to sever web 24. If desired, other suitable cutting means may be substituted for the disk blade. Typical cutting devices include laser cutters, straight edge knives, guillotine shear, and the like. Actuation and reciprocation of disc shaped cutting blade 126 along cutting edge 48 is accomplished by programmable controller 56 to control suitable conventional valves (not shown) connected to a source of compressed gas that is supplied to hollow nonmagnetic shaft 108. In order to avoid collision between cutting blade 126 and web pick up assembly 58 when web pick up assembly 58 is traveling to its home position, cutting blade 126 is moved to its own home position (shown in FIG. 5) when it is not severing web 24.

Figure 6:
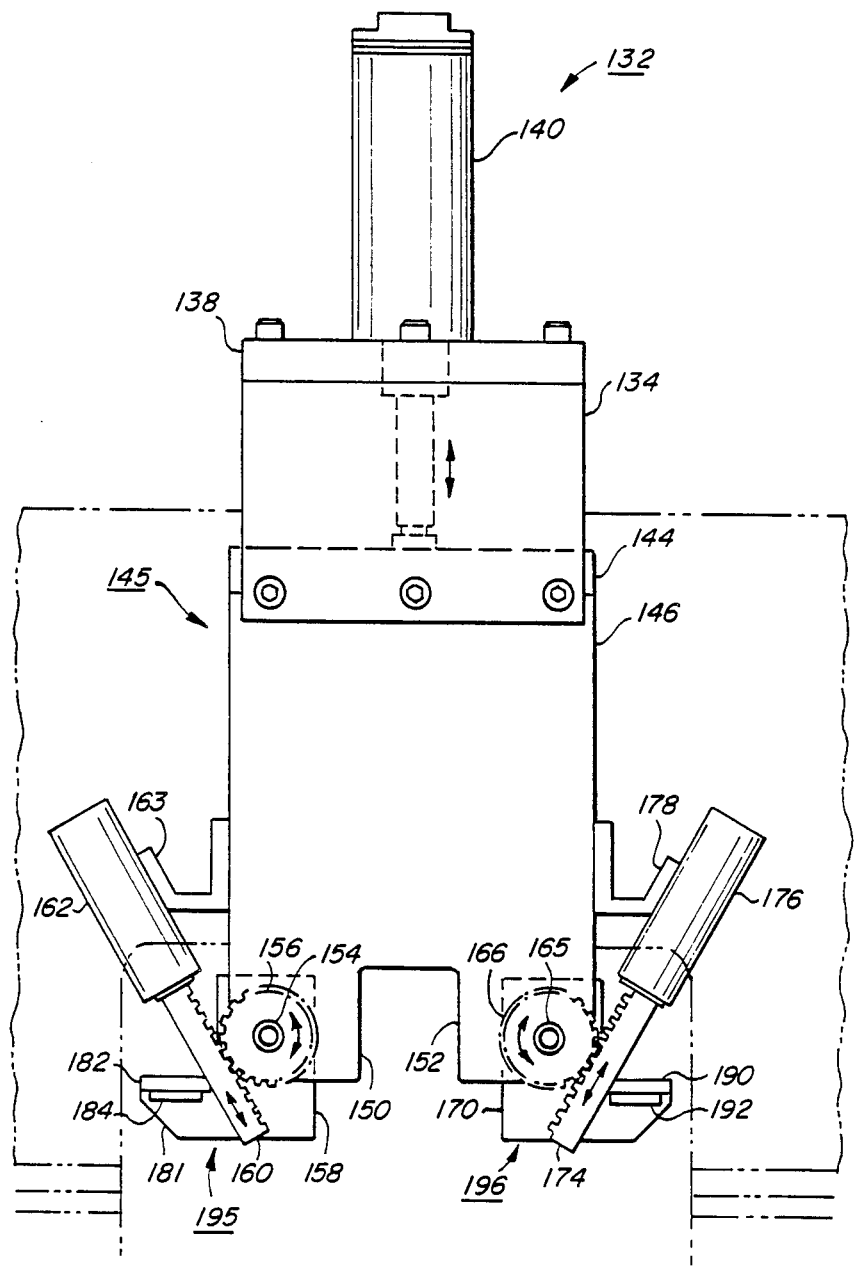
FIG. 6 is an expanded schematic, section end view of a belt loop shaping assembly.
Figure 7:
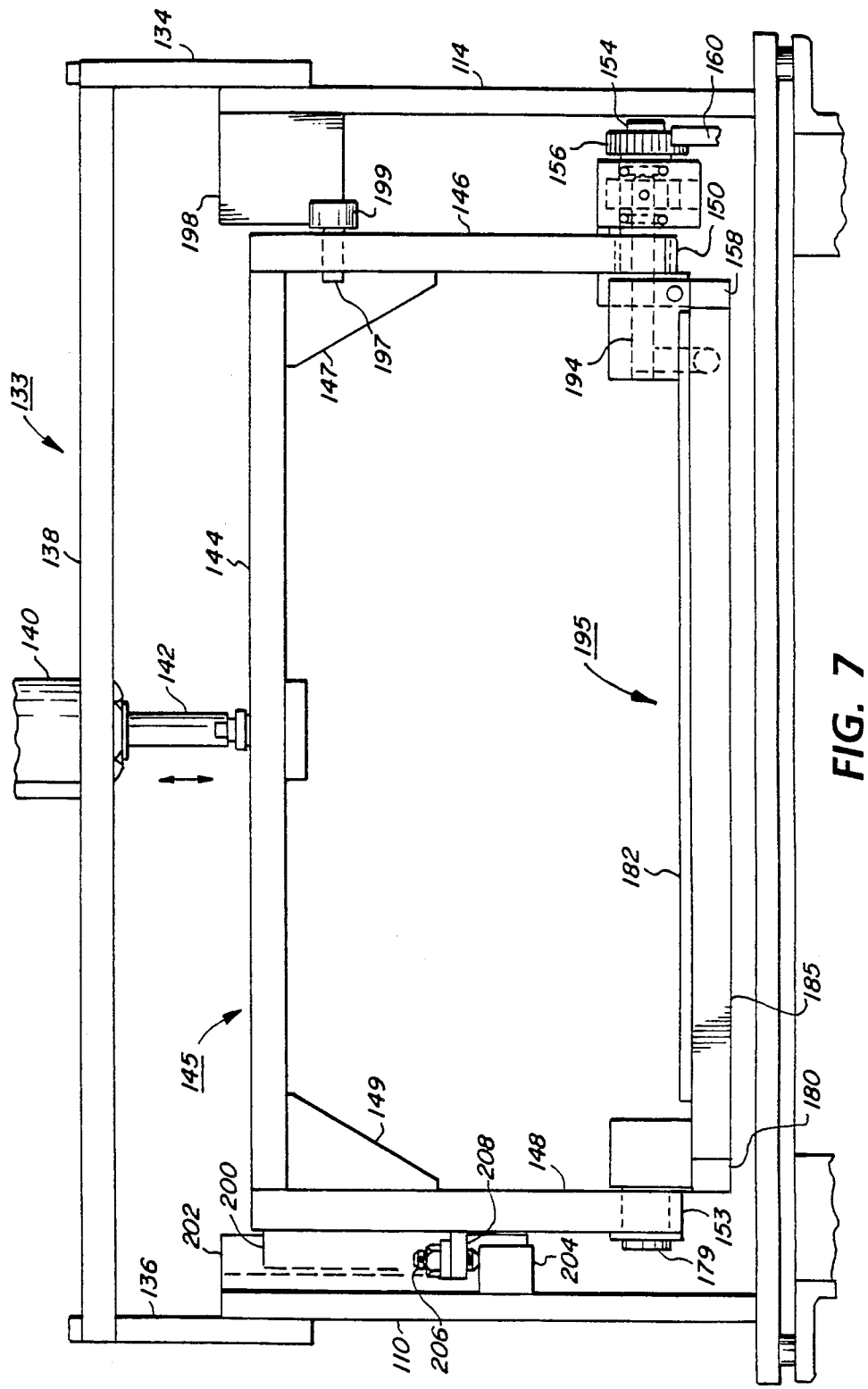
FIG. 7 is an expanded schematic, sectional side view of a belt loop shaping assembly.

Referring to FIGS. 4, 5, 6 and 7, a belt loop shaping assembly 132 is shown comprising stationary vertical plates 134 and 136 bolted to side plate 114 and side plate 110, respectively. The ends of horizontal stationary plate 138 are bolted to stationary vertical plates 134 and 136. Mounted on the top of horizontal stationary plate 138 is a pneumatic cylinder 140. Pneumatic cylinder 140 is a conventional two-way acting cylinder in which piston movement is determined by which side of the piston is pressurized. In other works, the piston is made to move in one direction by pressurized air introduced onto a first chamber on a first side of the piston and made to move in the opposite direction by diverting the pressurized air into a second chamber on the other side of the piston while venting the first chamber. Actuation of pneumatic cylinder 140 is accomplished by programmable controller 56 to control conventional valves to connect pneumatic cylinder 140 by suitable air hoses (not shown) to a source of pressurized as or to the atmosphere. Reciprocateable piston rod 142 extends downwardly from pneumatic cylinder 140. The lower end of reciprocateable piston rod 142 is fastened to horizontal plate 144 of reciprocateable looping assembly 145. One end of horizontal plate 144 is bolted to the top vertical plate 146 with the aid of angle bracket 147 and the other end is bolted to the top vertical plate 148 with the aid of angle bracket 149. The bottoms of vertical plate 146 and vertical plate 148 are bifurcated to form two legs. Legs 150 and 152 at the bottom of vertical plate 146 are illustrated in FIG. 6. Leg 150 located at the bottom of vertical plate 146 and leg 153 at the bottom of vertical plate 148 are shown in Fig. 7. Leg 150 on vertical plate 146 supports a rotatable horizontal shaft 154 which extends outwardly from each side of leg 150. A rack and pinion arrangement is employed to rotate rotatable horizontal shaft 154 with pinion 156 mounted on rotatable horizontal shaft 154 on the side of leg 150 which faces away from vertical plate 148. The other end of rotatable horizontal shaft 154 is rigidly secured to and supports a pivotable 'L' shaped side plate 158. Pinion 156 is driven by reciprocateable rack 160. Rack 160 is reciprocated by pneumatic cylinder 162 which is rigidly secured to vertical plate 146 by flange 163. Pneumatic cylinder 162 is a conventional two-way acting cylinder in which piston movement is determined by which side of the piston is pressurized. Mounted on leg 152 is a mirror image arrangement of the assembly mounted on leg 150, namely a rotatable horizontal shaft 165 which extends outwardly from each side of leg 152; a pinion 166 mounted on rotatable horizontal shaft 165; pivotable "L" shaped side plate 170, reciprocateable rack 174; pneumatic cylinder 176; and flange 178. Actuation of pneumatic cylinders 162 and 176 is accomplished by programmable controller 56 to control conventional valves to independently connect pneumatic cylinders 162 and 176 by suitable air hoses (not shown) to a source to pressurized gas or to the atmosphere. On the side of each leg of the bifurcated bottom of vertical plate 148 facing vertical plate 146, a rotatable shaft 179 (shown in FIG. 7) on leg 153 of vertical plate 148 and an identical rotatable shaft (not shown) on the other companion leg (not shown) of vertical plate 148 are mounted at locations directly opposite from respective rotatable shafts 154 and 165 on vertical plate 146. A pivotable "L" shaped side plate 180 having a shape that is a mirror image of pivotable "L" shaped side plate 158 is mounted on rotatable shaft 179 on the leg 153 of vertical plate 148 directly opposite from the location of respective rotatable shaft 154. Similarly, a pivotable "L" shaped side plate (not shown) having a mirror image shape of pivotable "L" shaped side plate 170 is mounted on the rotatable shaft (not shown) on the leg of vertical plate 148 directly opposite from the location of respective rotatable shaft 165. Arm 181 of pivotable "L" shaped side plate 158 and the corresponding arm (not shown) on the directly opposite mirror image pivotable "L" shaped side plate 180 cooperate with each other to carry a vacuum shoe 182 beneath which is located a vacuum plenum 184 (shown in FIG. 6) which extends along the length of vacuum shoe support plate 185 (shown in FIG. 7). Similarly, arm 186 of pivotable "L" shaped side plate 170 and the corresponding leg on the directly opposite mirror image pivotable "L" shaped side plate supported by vertical plate 148 cooperate with each other to carry a vacuum shoe 190 beneath which is located a vacuum plenum 192. The length of vacuum shoe 182 and vacuum shoe 190 is normally slightly shorter than the width of web 24. Any suitable vacuum shoe, such as a shoe similar to the previously described vacuum shoe 52, may be utilized for vacuum shoes 182 and 190. Vacuum plenums 184 and 192 are connected by passages such as passage 194 (shown in FIG. 7) to suitable fittings and hoses through control valves (not shown) to a vacuum source. Activation and inactivation of vacuum plenums 184 and 192 are independently accomplished by programmable controller 56 to control conventional valves to connect vacuum plenums 184 and 192 by suitable hoses (not shown) to a source of vacuum or to vent the vacuum plenums to the atmosphere. The combination of pivotable "L" shaped side plates 158 and 180 with vacuum shoe 182 and vacuum shoe support plate 185 comprise a first invertable gripper assembly 195. The combination of pivotable "L" shaped side plates 170 and its companion pivotable "L" shaped side plates (not shown) with vacuum shoe 190 and its underlying vacuum shoe support plate (not shown) comprise a second invertable gripper assembly 196.

As shown in FIG. 7, the vertical path of vertical plate 146 during reciprocation by pneumatic cylinder 140 is guided by a pair of cam followers 199 (only one is shown in FIG. 7) rotatably mounted on shafts 197 (only one is shown in FIG. 7) secured to vertical plate 146.

The pair of cam followers 199 straddle vertical guide rail 198 which is welded to side plate 114. The vertical path of vertical plate 148 is guided by slide tongue 200 (only one is shown in FIG. 7) fixed to vertical plate 148. slide tongue 200 rides in a vertical slide groove in grooved block 202 which is secured to side plate 110. Hard stop block 204 mounted to side plate 110 and set screw 206 threaded into flange 208 serve to define the lower limit of travel of vertical plates 146 and 148.

Figure 8:
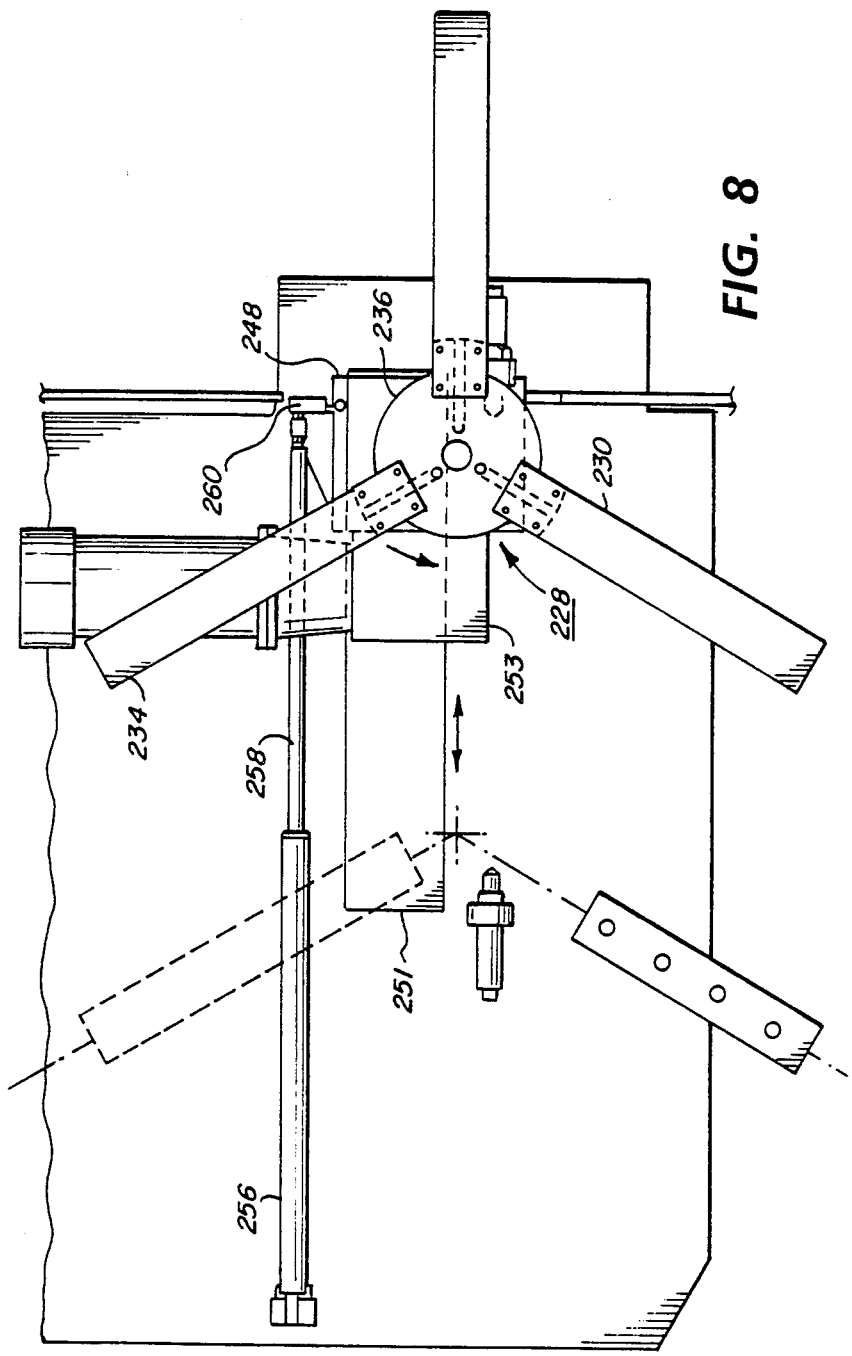
FIG. 8 is a schematic, sectional plan view of a belt transport assembly.
Figure 9:
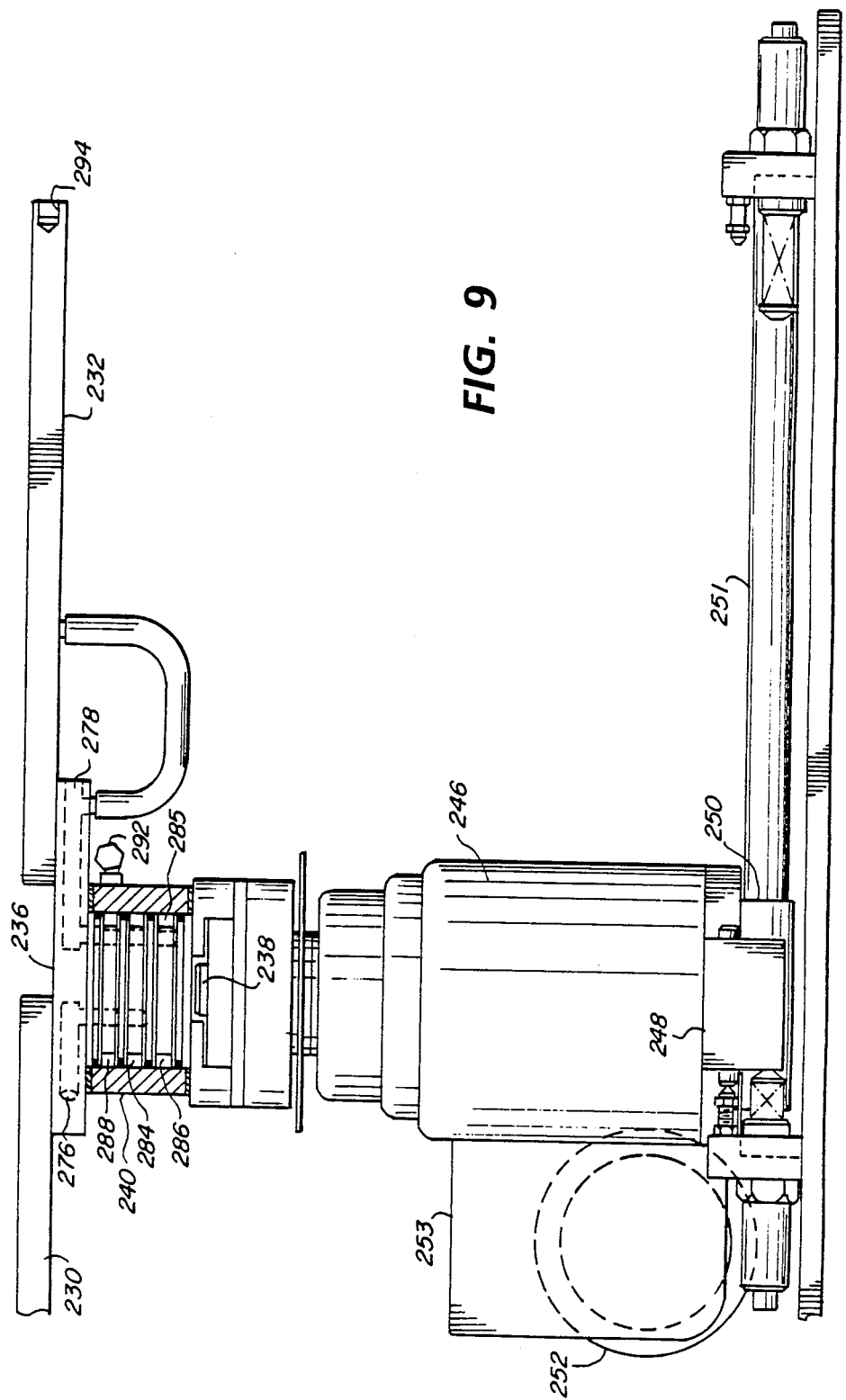
FIG. 9 is a schematic, sectional view in elevation of airways in a belt transport assembly.

Referring to FIGS. 8 and 9, belt transport assembly 228 is illustrated comprising three elongated anvils 230, 232, and 234. The elongated anvils are horizontally cantilevered 120° apart from a rotatable dial table 236 mounted to journal shaft 238 passing through journal box 240 into index housing 246. Journal box 240 and index housing 246 are secured to plate 248 bolted to a suitable ball bearing slide block 250 slideably mounted on a slide rail schematically represented by rectangle 251. Any suitable slide maybe employed to support stand 246. Typical slides include THK, Tokyo, Japan; Roller Slide, Solon, Ohio; and the like. Dial table 236 is adapted to rotate when journal shaft 238 is driven by electric motor 252 through suitable gearing in gear housing 253 attached o the side of stand 246. Dial table 236 is rotated when it is necessary to index each anvil from one processing station to the next. Slide block 250 is reciprocated between a fully retracted position (represented by phantom lines in FIG. 8) and an advanced load position by means of a suitable pneumatic cylinder 256 which drives a piston connecting rod 258 fastened to flange 260 mounted on the side of slide block 250. Pneumatic cylinder 256 is a conventional two-way acting cylinder in which piston movement is determined by which side of the piston is pressurized. Slide block 250 is reciprocated from the fully retracted position to the advanced load position by pneumatic cylinder 256 to facilitate loading of a freshly formed web loop (not shown) onto an empty anvil at belt loop forming station 10. Slide block 250 is reciprocated from the advanced load position to the fully retracted position by pneumatic cylinder 256 to allow indexing of anvils from the belt loop forming station 10 without an anvil striking any part of belt loop forming station 10. Timely actuation of electric motor 252 and pneumatic cylinder 256 are accomplished by programmable controller 56.

In FIG. 9a representative elongated anvil 232 is shown having pattern of vacuum grooves 263 and 264 positioned along each side of a hard metal strip insert 265 extending along the length of the upper surface of elongated anvil 262. Hard metal strip insert 265 may comprise any suitable material such as stainless steel, A4 tool steel, 02 steel, and the like, which can withstand abrasive conditions such as those encountered during belt lap joint welding. Vacuum grooves 262, 263 and 264 should be positioned over a sufficient width of the upper surface of elongated anvils 230, 232 and 234 to attract and retain both ends of the belt loop formed at belt loop forming station 10. Hard metal strip insert 265 is normally at least as long as the lap joint n the overlying web loop. A plurality of passages (not shown) distributed along vacuum grooves 263 and 264 connect vacuum grooves 263 and 264 to an underlying vacuum plenum 270.

With reference to FIGS. 8, 9 and 9a, vacuum grooves on the upper surface of anvil 230 and 232 are independently connected through interior vacuum plenums to airways 276 and 278 (the third airway is not shown), respectively, that extend through journal box 240 to ports entering circumferential channels 284 and 285, respectively, each of the channels being separated by "O" ring seals 286. Circumferential channel 288 is connected to the third plenum by airways not shown. Circumferential channels 284, 285 and 288 are connected through corresponding air line through the journal box 240 to suitable electrically activateable valves (not shown). For example, in FIG. 9, circumferential channel 288 is shown connected to fitting 292 which in turn is coupled by a suitable hose (not shown) to an electrically activateable valve (not shown). The free end of each of the elongated anvils 230, 232 and 234 contains an alignment pin receiving hole 294 utilized in combination with alignment pins located at various processing stations and prevent undue deflection of the free end of elongated anvils 230, 232 and 234. For example an alignment pin 296 is shown below belt loop shaping assembly 132 in FIG. 5. Any suitable conventional solenoid operated valve may employed to provide vacuum or pressure to the components of this invention. Positive pressure, a vacuum or ambient air pressure may be supplied from any suitable conventional source to the journal box 240 by conventional means such as suitable air coupling lines (not shown). Conventional electrical switching is employed to couple or uncouple electric motors with an electrical power source through suitable circuitry in response to a signal from a suitable programmable controller 56 such as a Allen Bradley Programmable Controller, Model No. 2/05 or Model No. 2/17.

Figure 10:
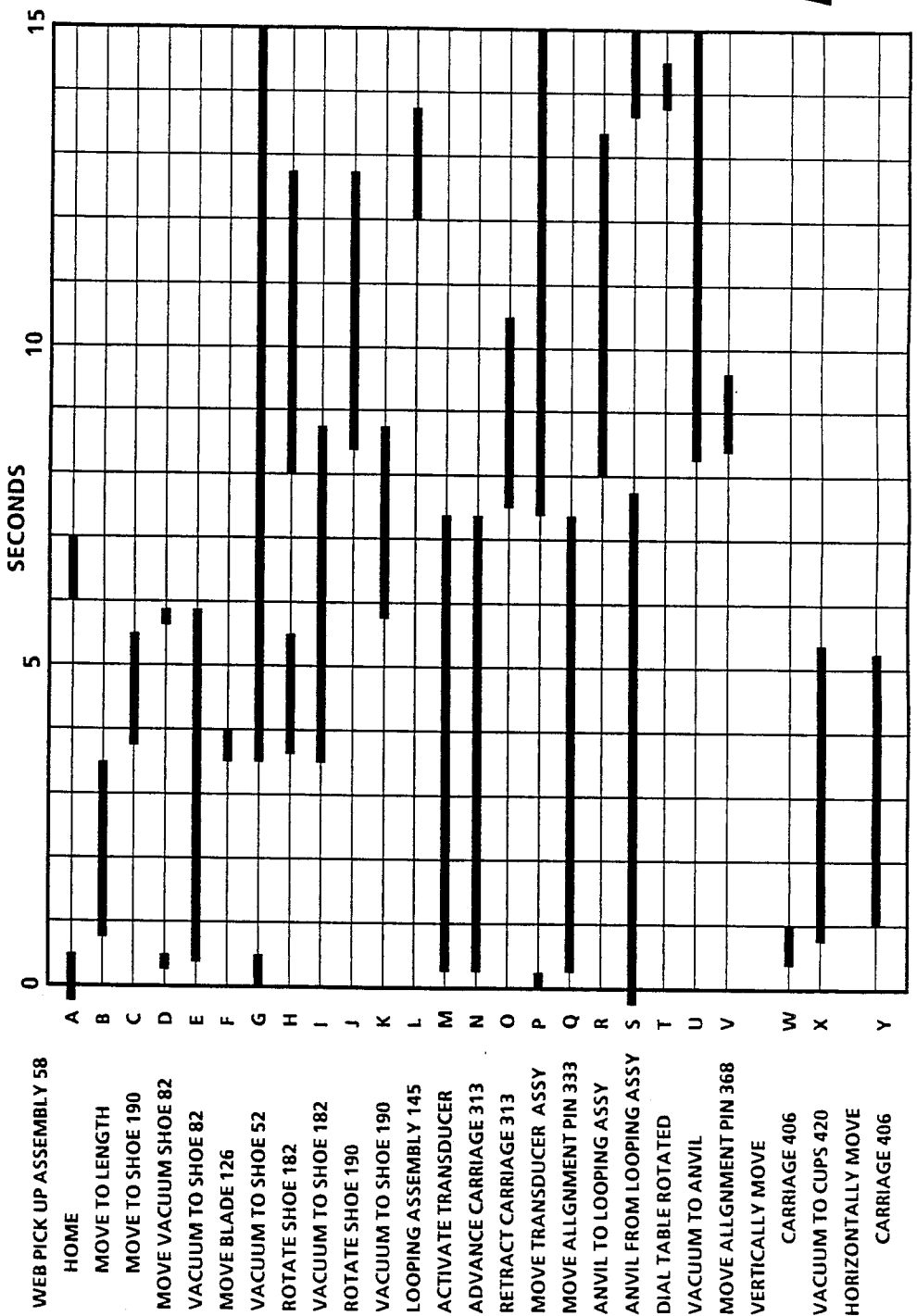
FIG. 10 is a timing chart for a belt forming system.
Figure 10F:
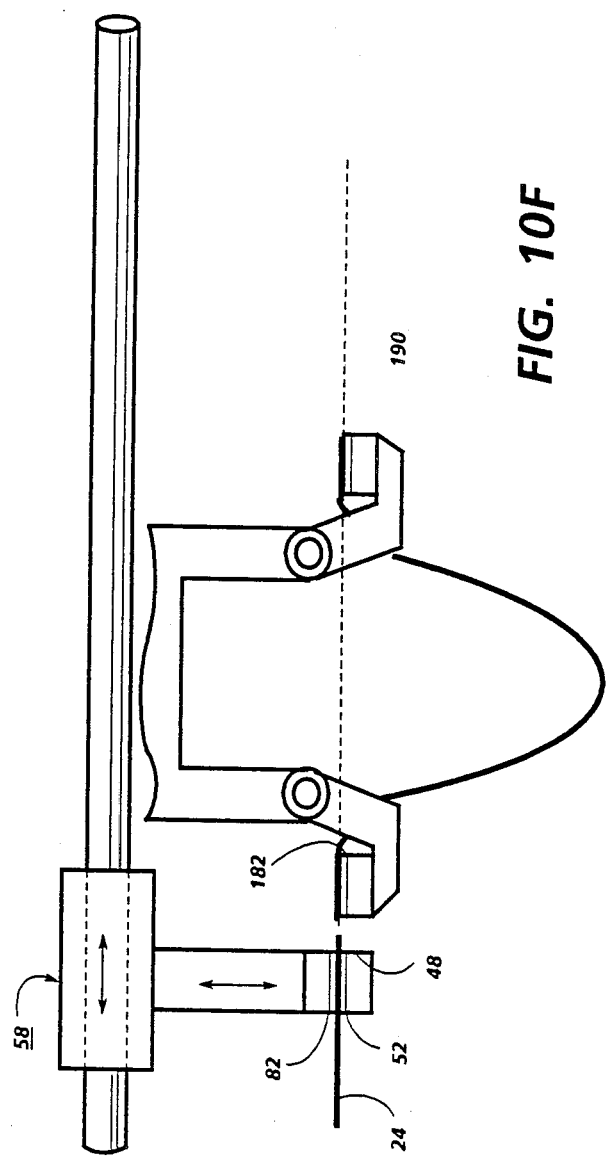
Figure 11:
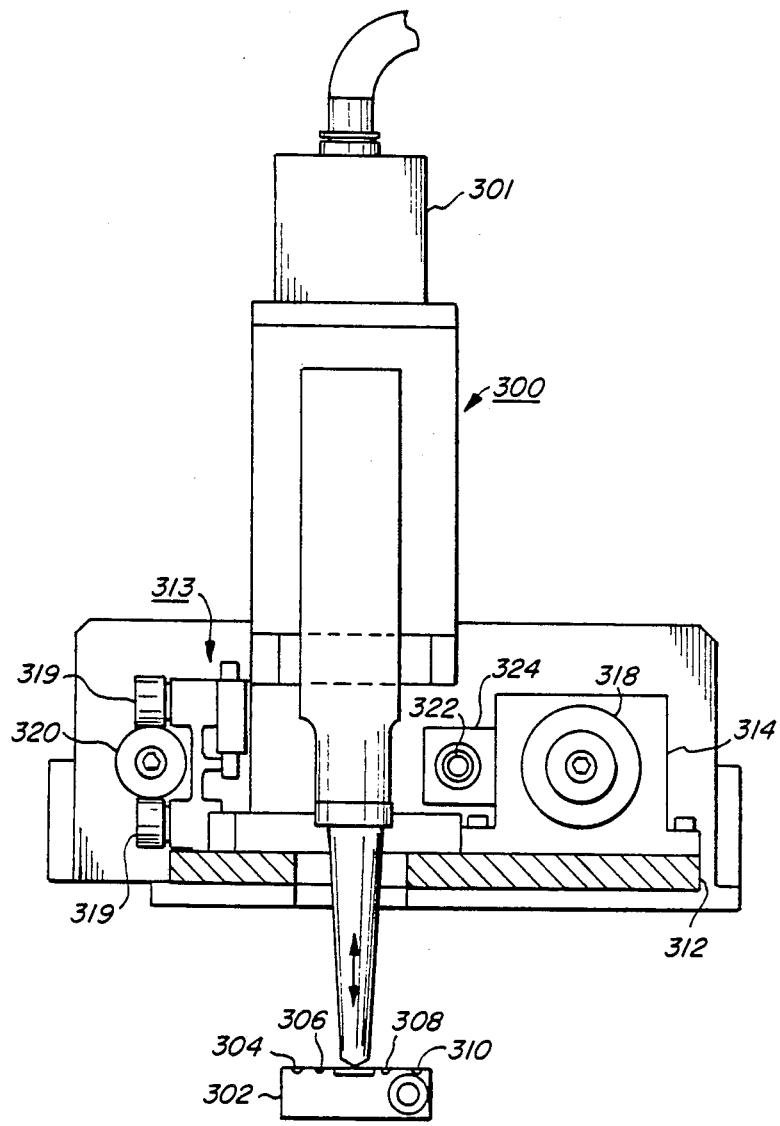
FIG. 11 is a schematic, sectional view in elevation of a welding means for welding belts on an anvil.
Figure 12:
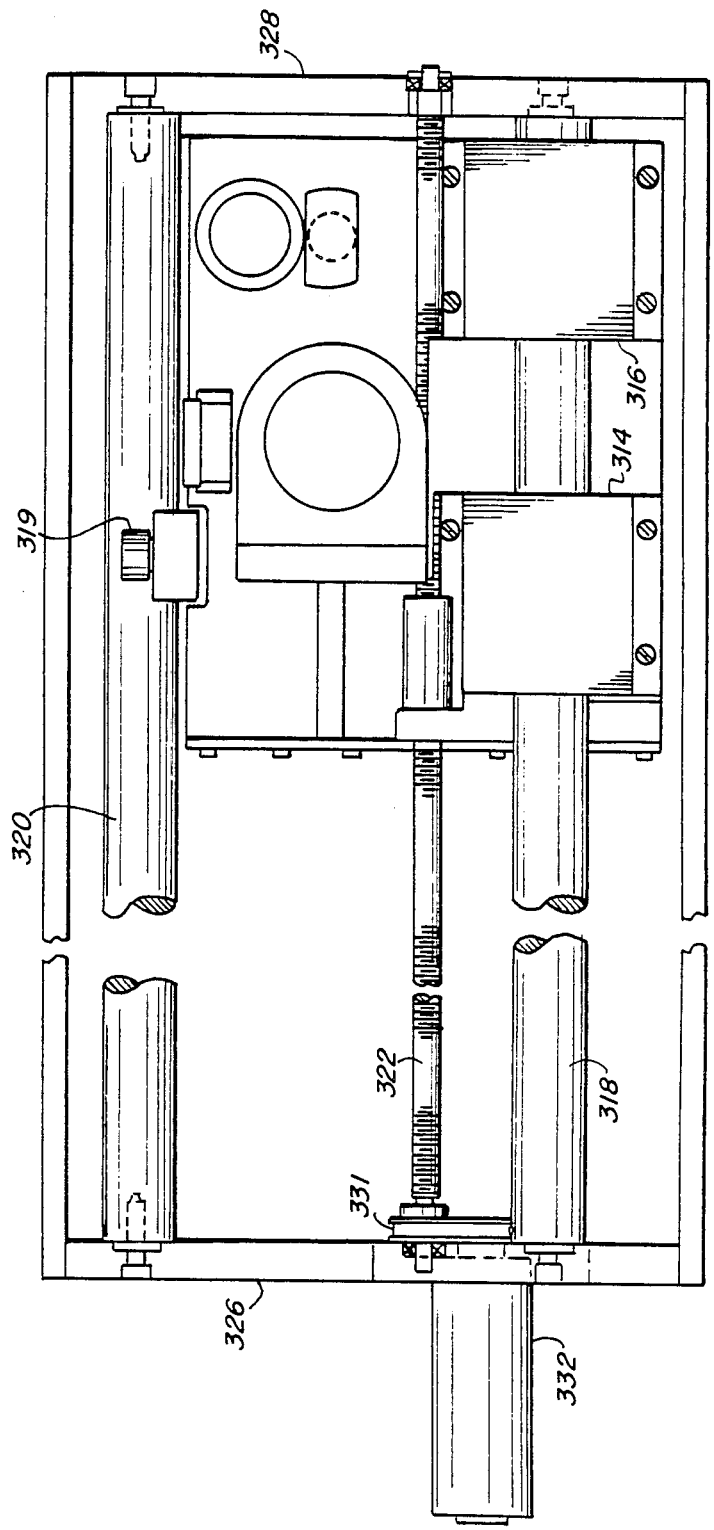
FIG. 12 is a schematic, sectional plan view of a welding means for welding belts on an anvil.
Figure 13:
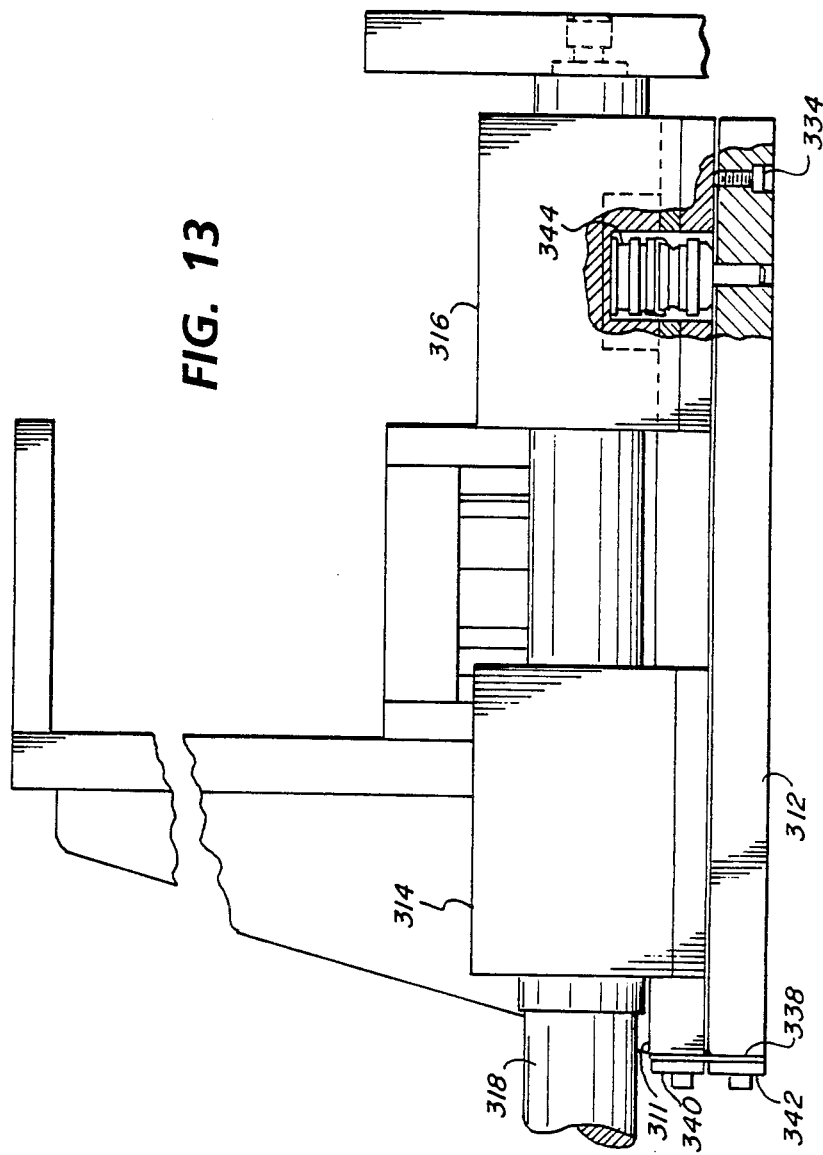
FIG. 13 is a schematic, sectional view in elevation of a welding means for welding belts on an anvil.

In operation, and with reference to the belt forming timing sequence illustrated in FIG. 10, reciprocating web pick up assembly 58 is initially at a retracted home position (see line A of FIG. 10) and pivotable plate 68 is pivoted up to raise vacuum shoe 82 up and away from the upper surface of web 24. The leading edge of web 24 is flush with cutting edge 48 as a result of shearing during the previous web loop forming cycle. Dancer roll 32 compensates for any tendency of slack to form in web 24 when reciprocating web pick up assembly 58 is in the retracted position and also assists in maintaining web 24 under tension during the web loop forming operation. When reciprocating web pick up assembly 58 is in its retracted position, a vacuum is applied at vacuum shoe 52 (line G) to retain the leading edge of web 24 against web receiving platform 50. Reciprocateable looping assembly 145 is down in the home position (L) with the vacuum shoes 182 and 190 facing upwardly. The upwardly facing surface of vacuum shoes 182 and 190 are at about the same plane as the upwardly facing surface of web receiving platform 50 as shown in FIGS. 4 and 10A. Pivotable plate 68 is then pivoted downwardly by activation of solenoid 74 to lower vacuum shoe 82 against upper surface of web 24 (D). Vacuum is supplied to vacuum shoe 82 (E) and the previously supplied vacuum to vacuum shoe 52 is terminated (G). Pivotable plate 68 is then pivoted upwardly by inactivation of solenoid 74 to raise vacuum shoe 82 and lift the leading of web 24 from web receiving platform 50 (D). Reciprocating web pick up assembly 58 is thereafter advanced to the cutting position (represented by phantom lines in FIG. 4 and schematically illustrated in FIG. 10B) by activation of servomotor 88 to pull the desired length of web 24 past cutting edge 48 located on the downstream edge of web receiving platform 50 (B). Servomotor 88 is inactivated (B), a vacuum is applied to vacuum shoes 52 (G) to retain web 24 against web receiving platform 50, and a vacuum is applied at vacuum shoe 182 (I) to retain web 24 against vacuum shoe 182. Pressurized air is then sequentially supplied first to the home position end and then the opposite end of hollow nonmagnetic shaft 208 to advance disc shaped cutting blade 126 from its home position (shown in FIG. 5) along cutting edge 48 and then back to its home position (F) to shear web 24 (see also FIG. 10C). Pneumatic cylinder 162 is then activated to rotate vacuum shoe 182 around shaft 154 thereby simultaneously carrying the trailing edge of the newly formed web segment in a clockwise arc as shown in FIG. 10D and completely inverting the trailing edge (H). This movement causes the portion of the newly formed web segment between vacuum shoe 182 and 190 to form a downwardly hanging loop which greatly facilitates loop formation and prevents buckling of the web segment when the leading edge is subsequently transported to vacuum shoe 190. Servomotor 88 is activated to retract reciprocating web pick up assembly 58 to position vacuum shoe 82 and the leading edge of Web 24 over vacuum shoe 190 (C) as shown in FIG. 10E. If desired, servomotor 88 may optionally be activated prior to inverting vacuum shoe 182 to retract reciprocating web pick up assembly 58 a short distance toward its home position, e.g. about two inches, to provide slack and to ensure that the web segment between vacuum shoe 182 and 190 forms a downwardly hanging loop. Pivotable plate 68 is then pivoted downwardly by activation of solenoid 74 to lower vacuum shoe 82 (D) as illustrated in FIG. 10E and vacuum is supplied to vacuum shoe 190 (K). The vacuum supplied to vacuum shoe 82 is terminated (E) to allow transfer of the leading edge of web 24 to vacuum shoe 190. Pneumatic cylinder 162 is then activated (H) to rotate vacuum shoe 182 around shaft 154 counterclockwise to its home position thereby providing clearance for passage of reciprocating web pick up assembly 58. A illustrated in Fig. 10F, pivotable plate 68 is pivoted upwardly by inactivation of solenoid 74 to raise vacuum shoe 82 (D) away from vacuum shoe 190 and reciprocating web pick up assembly 58 is thereafter retracted to its home position by activation of servomotor 88 (A). Anvil 232 is indexed in a linear direction (R) into position under reciprocateable looping assembly 145 in preparation for receipt of a newly formed web loop by activation of pneumatic cylinder 256 (see FIG. 8). The alignment pin receiving hole 294 located at the free end of elongated anvil 232 engages alignment pin 296 (see FIG. 5) which securely mounted to side plate 110 by brackets (not shown) to stabilize anvil 232. A vacuum is supplied to vacuum grooves 262 and 264 (see FIG. 9A) on the upper surface of anvil 232 (U). Pneumatic cylinder 162 is again activated to rotate vacuum shoe 182 around shaft 154 carrying the trailing edge of the web segment in a clockwise arc, inverting the trailing edge of the web segment and bringing the trailing edge into contact with the upper surface eof anvil 232 (H). Pneumatic cylinder 176 is then activated to rotate vacuum shoe 190 around shaft 165 thereby simultaneously carrying the leading edge of the newly formed web segment in a counter clockwise arc and completely inverting the leading edge (J) as shown in FIG. 10G to form a belt loop having a lap joint in which the leading edge overlaps the trailing edge. By reversing the sequence of inverting vacuum shoes 182 and 190, a belt may be prepared in which the trailing edge overlaps the leading edge. This is particularly useful for achieving different lap joints from a rolled web having one edge that is different from the opposite edge, e.g. only one edge carries a grounding strip. The vacuum supplied to vacuum shoes 182 (I) and 190 (K) is terminated to allow transfer of the newly formed belt loop to the upper surface of anvil 232. Pneumatic cylinder 140 is activated (L) to raise reciprocateable belt looping assembly 145, including vacuum shoes 182 and 190, away from the newly formed belt loop carried on the upper surface of anvil 232 thereby facilitating removal of the transferred belt loop. Pneumatic cylinders 162 and 176 are then activated to rotate vacuum shoes 182 and 190 to their original upwardly facing positions. Pneumatic cylinder 256 is activated to retract anvil 232 (S) away from under reciprocateable looping assembly 145 in preparation for welding (see phantom lines in FIG. 8). Pneumatic cylinder 140 is activated (L) to return reciprocateable looping assembly 145, including vacuum shoes 182 and 190, to their original home position. Electric motor 252 is activated to rotate dial table 120° and convey the newly formed belt loop carried on anvil 232 to belt welding station 12 (T).

If culling of defective segments of web 24 is desirable, reciprocating web pick up assembly 58 is initially at a retracted home position (A) and pivotable plate 68 is pivoted up to raise vacuum shoe 82 up and away from the upper surface of web 24. The leading edge of web 24 is flush with cutting edge 48 as a result of shearing during the previous web loop forming cycle. Dancer roll 32 compensates for any tendency of slack to form in web 24 when reciprocating web pick up assembly 58 is in the retracted position and also assists in maintaining web 24 under tension during the web loop forming operation. When reciprocating web pick up assembly 58 is in its retracted position, a vacuum is applied at vacuum shoe 52 to retain the leading edge of web 24 against web receiving platform 50. Reciprocateable looping assembly 145 is down in its home position with vacuum shoes 182 and 190 facing upwardly. The upwardly facing surfaces of vacuum shoes 182 and 190 are at about the same plane as the upwardly facing surface of web receiving platform 50 as shown in FIG. 4. Pivotable plate 68 is then pivoted downwardly by activation of solenoid 74 to lower vacuum shoe 82 against the upper surface of web 24. Vacuum is supplied to vacuum shoe 82 and the previously supplied vacuum to vacuum shoe 52 is terminated. Pivotable plate 68 is then pivoted upwardly by inactivation of solenoid 74 to raise vacuum shoe 82 and lift the leading edge of web 24 from web receiving platform 50 (D). Activation of servomotor 88 advances reciprocating web pick up assembly 58 a predetermined distance from cutting edge 48 to provide an overhang of web material past cutting edge 48. Vacuum is resupplied to vacuum shoe 52 and the vacuum supplied to vacuum shoe 82 is terminated. Servomotor 88 is activated to return reciprocating web pick up assembly 58 to its home position. Pivotable plate 68 is then pivoted downwardly by activation of solenoid 74 to lower vacuum shoe 82 against the upper surface of web 24. Vacuum is supplied to vacuum shoe 82 and the previously supplied vacuum to vacuum shoe 52 is terminated. Pivotable plate 68 is then pivoted upwardly by inactivation of solenoid 74 to raise vacuum shoe 82 and lift the leading edge of web 24 from web receiving platform 50 (D). By applying bar codes to one edge of the web 24 and employing sensors to detect defective sections of the web prior to, during and after coating, predetermined defect maps based on the bar code reference marks on the web 24 may be detected by a suitable bar code reader 297 (see FIG. 3) such as a bar code scanner available from Scope, Inc., Reston, Virginia. When the scanner detects a bar code that has previously been identified as indicating the location of a defect on web 24, the detection signal is transmitted to programmable controller 56. Upon receiving the defect detection signal, programmable controller 56 is programmed to switch to the culling mode. Activation of servomotor 88 advances reciprocating web pick up assembly 58 until the leading edge of the web overhand extending beyond vacuum shoe 82 enters the nip of rotating culling rollers 298 and 299 shown in FIG. 4. If the cull length is shorter than the distance from the nip rollers to the cutting edge 48, the web pick up assembly 58 may be stopped at the desired length to allow shearing of the web at the cutting edge 48. After shearing, web pick up assembly 58 advances to feed the leading edge into the nip of the culling rollers. Vacuum supplied to vacuum shoe 82 is terminated as rotating nip rollers 298 and 299 proceed to convey the culled web material to waste disposal chute (not shown). Web pick up assembly 58 is then returned to its home position. If the fresh web to be processed next is free of defects, a normal belt forming cycle is begun.

When a belt of a different size is required which has a greater or lesser width and/or diameter than the belts currently in production, nothing need be added or removed from the apparatus of this invention. Different widths may be readily accommodated by merely readjusting the edge guides 44 and 46. If the vacuum shoe on the vacuum pick up arm is slightly shorter than the width of a new photoreceptor web, the pick up arm could probably be used either in a modified or unmodified configuration. Modifications that can be made to an original pick up arm having a vacuum shoe that is too long include applying tape, putty or other suitable material over the portion of the slots in the pick up arm vacuum shoe that extend beyond the edge of the new web. Belt length changes can be instantly made merely by adjusting the programmable controller 56 to alter the distance that the web pick up assembly 58 pulls the web 24 from cutting edge 48.

Referring to FIGS. 1, 11, 12 and 13, an ultrasonic belt welding station 12 comprising an ultrasonic horn and transducer assembly 300 is illustrated. A solenoid 301 is mounted above ultrasonic horn and transducer assembly 300 to extend or retract ultrasonic horn and transducer assembly 300 in a vertical direction. The web lap joint (not shown) formed by the overlapping segment ends of thermoplastic web 24 is supported by the upper surface of anvil 302 and held in place below the path of ultrasonic horn and transducer assembly 300 by suction from parallel rows of grooves 304, 306, 308 and 310 (see FIG. 10). The ultrasonic horn and transducer assembly 300 is supported by the lower end of a vertically reciprocateable shaft (not shown) extending from the lower end of solenoid 301 mounted to the upper hinged half 311 of a substantially horizontally reciprocateable carriage 313. One side of of the lower hinged half 312 of carriage 313 is suspended from pillow blocks 314 and 316 which in turn slide on horizontal bar 318. The other of carriage 313 is suspended from a pair of cam followers 319 that roll on the outer surface of horizontal bar 320. A rotatable lead screw 322 drives horizontally reciprocateable carriage 313 through ball screw 324 secured to carriage 313. Horizontal bars 318 and 320 as well as lead screw 322 are supported at each end by flanges 326 and 328 which are secured to frame assembly 330 (see FIG. 1). Lead screw 322 is rotated by a belt 331 driven by electric motor 332 which is also supported by frame assembly 330. An alignment pin 333 (see FIG. 1) is mounted to frame assembly 330 and is adapted to mate with alignment pin receiving hole 294 at the free end of anvil 302 when anvil 302 is indexed into position for welding of the belt lap joint. Adjustable set screw 334 is positioned to extend upwardly from the lower hinged half 312 of carriage 313 to assist in maintaining a predetermined spacing between the bottom of the ultrasonic horn of horn and transducer assembly 300 and the top of anvil 302 and to ensure a uniform pressure on the web lap joint as the bottom of the ultrasonic horn traverses the lap joint. The end of set screw 334 rests against the bottom of upper hinged half 311 of carriage 313. The upper hinged half 311 and lower hinged half 312 of carriage 313 are joined by a hinge comprising a thin metal shim 338 fastened to upper hinged half 311 by bolted plate 340 and fastened to lower hinged half 312 by bolted plate 342. The hinge allows upper hinged half 311 of carriage 313 and ultrasonic horn of horn and transducer assembly 300 to pivot along the hinge during welding to compensate in a substantially vertical direction for any irregularities encountered along the lap joint 301 during welding. An air bellows 344 is positioned between upper hinged half 311 and lower hinged half 312 of carriage 313 to adjust the pressure of the bottom of the ultrasonic horn 300 against the web lap joint, e.g. to function as a counterbalance.

In operation, and with reference to the belt welding timing sequence illustrated in FIG. 10, ultrasonic horn and transducer assembly 300 is in a retracted position because solenoid 301 (P) is activated. Anvil 302 carrying a looped segment of web severed from web 24 at belt loop forming station 10 was previously withdrawn (S) in a linear direction from under reciprocateable looping assembly 145 (see FIG. 7) and indexed to rotate it (T) and the belt welding station 12. Indexing was achieved by providing power to electric motor 252 (see FIGS. 8 and 9) to rotate anvil 302 by means of suitable means such as bevel gears in gear housing 253 and journal shaft 238 to simultaneously advance anvil 302 bearing an unwelded belt loop to web welding station 12, advance an anvil bearing a welded belt to belt discharge station 15 from belt welding station 12, and advance an empty anvil from belt discharge station 15 into to position for linear transport into belt loop forming station 10. Upon arrival of anvil 302 at belt welding station 12, solenoid 301 (P) is inactivated to extend the transducer in ultrasonic horn and transducer assembly 300 toward anvil 302, the transducer in ultrasonic horn and transducer assembly 300 is activated (M), electric motor 332 (see FIG. 12) is activated (N) to drive lead screw 322 which in turn moves horizontally reciprocateable carriage 313 over the lap joint of the web loop carried by anvil 302, and solenoid 345 (see FIG. 1) is activated (Q) to drive alignment pin 333 into alignment pin receiving hole 294 located at the free end of anvil 302.

Lowering of the transducer in ultrasonic horn and transducer assembly 300 by inactivation of solenoid 301 brings the ultrasonic horn into compressive engagement with the seam of the overlapping ends of web 24. The welding surface of the ultrasonic horn in ultrasonic horn and transducer assembly 300 may be of any suitable shape such as the flat or curved cross-sectional shapes illustrated, for example, in U.S. Pat. No. 3,459,610 and U.S. Pat. No. 4,532,166, both of which are incorporated herein by reference in their entirety. The high vibration frequency of the ultrasonic horn along the its vertical axis causes the temperature of at least the contiguous overlapping surfaces of thermoplastic web 24 to increase until at least the thermoplastic material in web 24 flows. Welding of the contiguous overlapping surface of thermoplastic web 24 will also occur if web 24 also comprises thermoplastic material which flow as a result of the applied energy of ultrasonic oscillations. The thermoplastic web 24 may be coated with thermoplastic coatings. The thermoplastic material that is induced to melt and weld the seam may be provided solely by a coating on the web, from both a coating and a web substrate, or solely from the web itself. The web may be of any suitable thickness which will allow adequate heating of the contiguous overlapping surfaces of the web edges to permit sufficient heat energy to be applied at the contiguous overlapping surfaces to cause the thermoplastic material to melt and weld the overlapping edges of web 24 at seam 138. Any suitable heating technique may be used to provide the heat necessary at the contiguous overlapping surfaces to melt the thermoplastic material and cause it to weld web 24 at the lap joint. Typical heating techniques include ultrasonic welding, radio frequency heating and the like. Ultrasonic welding is preferred because it causes generation of heat at the contiguous overlapping surfaces of the web edges at the lap joint to maximize melting of the thermoplastic material. If desired, the horn may comprise highly thermoconductive material such as aluminum to ensure achievement of higher temperatures at the interface between the overlapping edges of web 24 and to minimize thermal distortion of the exposed surfaces of the web 24. When ultrasonic welding is utilized it is believed that the rapid impaction of one edge of web 24 with the other edge of web 24 at the contiguous overlapping web surfaces between the anvil 302 and ultrasonic horn causes generation of heat. A horn vibration frequency of about 16,000 kHz or higher may be utilized to cause the thermoplastic material to soften. A typical horn suitable for joining thin thermoplastic webs utilizes a sonic generation of about 400–800 watt capacity, an operational frequency of about 20 kHz, and a flat input horn welding surface about 12 millimeters long and about 0.04 to 0.1 centimeter wide. A typical motion amplitude for this horn is about 76 micrometers. The combined weight of about 2.5 kilograms for the solenoid 301, ultrasonic horn and transducer assembly 300, and upper hinged half 311 of carriage 313 is sufficient to bring to horn into forced contact with the lap joint. However, air bellows 344, a spring bias, weights, counterweights, or other suitable means may be utilized to increase or decrease the contact force. Since heat is generated very rapidly at the interface of the overlapping web ends at the lap joint with this type of device, sufficient heat to cause the thermoplastic materials to melt can occur typically in about 0.2 second as the horn traverses the along the lap joint.

As the horn is lowered to the lap joint of web 24, electrical power is supplied to the transducer in ultrasonic horn and transducer assembly 300 (M) and electric motor 332 is activated (N) to drive lead screw 322 which in turn moves horizontally reciprocateable carriage 313 and ultrasonic horn 300 along the lap joint of web 24. After carriage 313 completes its traversal of the lap joint, solenoid 301 is activated (P) to retract the transducer in ultrasonic horn and transducer assembly 300 away from anvil 302, the transducer in ultrasonic horn and transducer assembly 300 is inactivated (M), solenoid 345 is inactivated (Q) to remove alignment pin 333 from alignment pin receiving hole 294, and electric motor 332 is reversed (O) to return horizontally reciprocateable carriage 313 to its starting position.

Upon completion of welding of the lap joint (not shown) of web 24 at belt welding station 12, the welded belt contains flashings at each end of the welded lap joint. These joints extend beyond the sides of the belt and are undesirable for many machines such as electrostatographic copiers, duplicators and copiers that require precise edge positioning of the belts during machine operation. However, some machines that require precision edge positioning, require it on one side only so that notching or trimming of the other side is not essential. Thus, the anvil bearing the freshly welded belt is preferably transported in a linear direction from belt welding station 12 to belt notching station 14 (see FIGS. 1 and 8) at the same time that another empty anvil cantilevered from rotateable dial table 236 is conveyed in a linear direction to belt loop forming station 10 to receive a newly formed belt loop.

Figure 14:
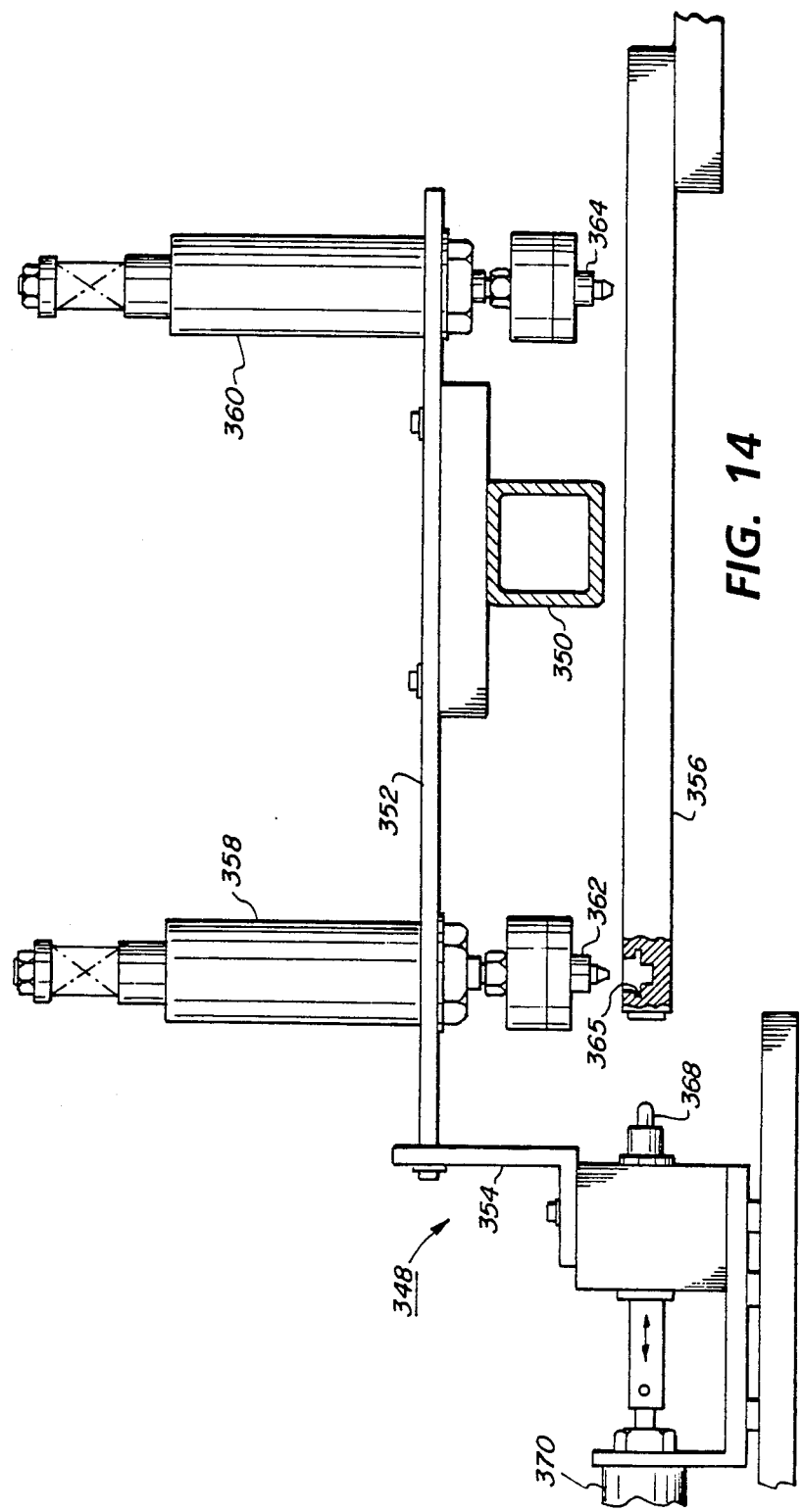
FIG. 14 is a schematic, sectional side view in elevation of a belt notching station.

Referring to FIGS. 1 and 14, belt notching station 14 comprises a bracket assembly 348 comprising a box bear 350, horizontal plate 352 and angle iron 354 which position the active components of belt notching station 14 over an anvil 356 transported to belt notching station 14 from belt welding station 12. Horizontal plate 352 carries a pair of mounted pneumatic cylinders 358 and 360 adapted to extend and retract punch cutters 362 and 364 into dies (one die 365 is shown in FIG. 14) carried in the upper surface of anvil 356. An alignment pin 368 and pneumatic cylinder 370 are mounted to angle iron 354. Alignment pin 368 is adapted to mate with alignment pin receiving hole 294 (see FIG. (9) at the free end of anvil 356 when anvil 356 is indexed into position for notching of the weld flashing at each end of the welded belt lap joint.

In operation, and with reference to the belt welding timing sequence illustrated in FIG. 10, and anvil 356 bearing a freshly welded belt is indexed in a linear direction (R) from belt welding station 12 to belt notching station 14 (see FIGS. 1 and 8) at the same time that another empty anvil cantilevered from rotateable dial table 236 is conveyed in a linear direction to belt loop forming station 10 to receive a newly formed belt loop. After anvil 356 is in position for notching, pneumatic cylinder 370 is activated (V) to drive alignment pin 368 into alignment pin receiving hole 294 located at the free end of anvil 356 to stabilize anvil 356. Pneumatic cylinders 358 and 360 are then activated to drive punch cutters 362 and 364 downwardly into dies located in anvil 356 adjacent to each end of welded lap joint of the belt carried by anvil 356. A vacuum is supplied to anvil 356 to maintain the welded belt in position while the flashings are removed during the notching operation.

Figure 15:
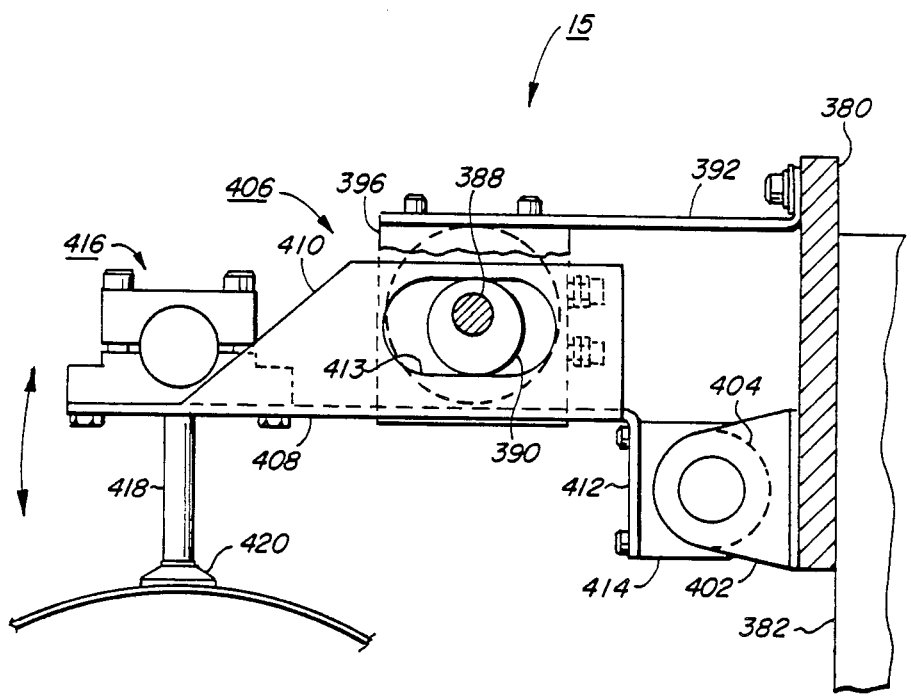
FIG. 15 is a schematic, sectional end view in elevation of a belt discharge station.

Referring to FIGS. 1 and 15, the welded belt (not shown) is removed from the free end of anvil 18 by discharge station 15. Belt discharge station 15 comprises an elongated vertical support plate 380 welded to one side of the upper end of a vertical stand 382 to form a "T" shaped structure. Cantilevered end brackets 392 and 386 are bolted to elongated vertical support plate 380. Cantilevered end brackets 392 and 386 carry shaft support bearings (not shown) adapted to receive the machined shaft ends (only machined end shaft 388 is shown in FIG. 15) of rotateable horizontal rod 390. The machined end shafts have a smaller diameter than the rotateable horizontal rod 390 and the common axis of the two machined end shafts is offset from the axis of rotateable horizontal rod 390. A pair of brackets having parallel cantilevered arms 392 and 394 is bolted to one end of vertical support plate 380. A vertical bracket 396 is bolted to the cantilevered arms 392 and 394. A reversible pneumatic motor 398 is mounted on vertical bracket 396. A shaft extension 400 provides a direct connection between the output drive shaft of reversible pneumatic motor 398 and machined end shaft 388. Rotateable horizontal rod 390 is intermittently rotated by reversible pneumatic motor 398. Reversible pneumatic motor 398 is connected by suitable fittings, hoses and solenoid operated valves to a source of compresses gas (not shown). Rotation of rotateable horizontal rod 390 through 180° increments by the reversible pneumatic motor causes the rotateable horizontal rod 390 to wobble upwardly or downwardly. A pair of end flanges (only end flange 402 is shown in FIG. 15) are also bolted to elongated vertical support plate 380. These end flanges support the ends of a horizontal, hollow nonmagnetic cylinder 404. Hollow nonmagnetic cylinder 404 contains a slidable magnetic piston (not shown) which is driven back and forth along the length of tube 404 by compressed gas alternately introduced at each end of tube 404 through suitable fittings, air hoses, and solenoid operated valves to a source of compresses air (not shown). A reciprocateable carriage 406 is mounted on rotateable horizontal rod 392 and a horizontal, hollow nonmagnetic cylinder 404. Carriage 406 comprises a horizontal metal plate 408 having a pair of end support flanges (only end support flange 410 is shown in FIG. 15) bent vertically upwardly and a side flange 412 bent vertically downwardly. The end support flanges (only end support flange 410 is shown in FIG. 15) each contain a slot 413 through which rotateable horizontal rod 390 extends to provide partial support for reciprocateable carriage 406. The pair of ends support flange (only end support flange 410 is shown in FIG. 15) bent vertically upwardly also carry bearing not shown which are adapted to slide along rotateable horizontal rod 392. A magnetic pillow block 414 is bolted to side flange 412. An elongated vacuum manifold 416 is bolted along the edge of horizontal metal plate 408 opposite side flange 412. Magnetic pillow block 414 is slideably mounted on the exterior of nonmagnetic cylinder 404. As the slidable magnetic piston is driven back and forth in hollow nonmagnetic cylinder 402 by compressed gas, the attractive magnetic force from the magnet piston attracts the magnetic pillow block 414 and causes magnetic pillow block 410 to slide back and forth on hollow nonmagnetic cylinder 402 in unison with he magnet piston. A magnetic reciprocating drive system similar to the type illustrated is available, for example, form Festo Corporation, Hauppauge, N.Y. Any other suitable reciprocating drive means may be substituted for the magnetic device. Typical reciprocating drive means include ball and lead screw, pneumatic piston, servomotor, and the like. Vacuum manifold 416 supports the upper ends of a plurality of downwardly extending vertical vacuum pipes 418 having resilient cups 420 secured to the lower ends. A vacuum is supplied to resilient cups 420 through vertical vacuum pipes 418, vacuum manifold 416 and suitable fittings, air hoses, and solenoid operated valves to a source of vacuum (not shown). A belt conveyor station 422 is positioned adjacent to belt discharge station 15 to carry way welded belts from belt discharge station 15. Welded belt conveyor station 422 comprises a continuous belt 424 to which are secured at spaced intervals a plurality of cantilevered arms 426. Continuous belt 424 is moved incrementally by means of a drive wheel (not shown) rotated by power supplied by electric motor 428 through gear box 430. Each incremental movement of belt 424 aligns the free end of an empty cantilevered arm 426 under the path of the reciprocating resilient cups 414 to receive and transport away welded belts from belt discharge station 15.

In operation, and with reference to the belt forming timing sequence illustrated in FIG. 10, carriage 406 is normally located at its home position (Y) which is the position closest to rotateable and reciprocateable belt conveying station 16. Carriage 406 is in its upwardly retracted position because the upper surface of offset rotateable horizontal rod 390 is at its highest position (W) due to positioning of the rotateable horizontal rod 390 in the slots in the pair of end support flanges (one end support flange 410 containing slot 413 is shown in FIG. 15) by the reversible pneumatic motor 398. No vacuum is supplied to resilient cups 420 (X). Anvil 22 (see FIG. 1) carrying a looped segment of web severed from web 24 at belt loop forming station 10 was previously withdrawn (S) in a linear direction from under reciprocateable looping assembly 145 (see FIG. 7) and indexed to rotate it (T) to belt welding station 12. Indexing was achieved by providing power to electric motor 252 (see FIGS. 8 and 9) to rotate dial index table 236 by means of suitable means such as bevel gears in gear housing 253 and journal shaft 238 to simultaneously advance anvil 22 (see FIG. 1) bearing an unwelded belt loop to web welding station 12, advance anvil 18 bearing a welded belt to belt discharge station 15 from belt welding station 12, and advance an empty anvil 20 from belt discharge station 15 into to position for linear transport into belt loop forming station 10. Upon arrival anvil 18 at belt discharge stain 15, the reversible pneumatic motor 398 is activated to rotate rotateable horizontal rod 390 180° to lower reciprocateable carriage 406 from its retracted position (W) and bring resilient cups 420 into engagement with the welded web as illustrated in FIG. 15 hanging from anvil 18. A vacuum is then supplied to resilient cups 420 (X). Since the vacuum supplied to anvil 18 from the time it receives a belt loop at the belt loop forming station 10 is finally terminated when the welded and notched belt arrives at the belt discharge station (U), the welded belt can readily be transferred to resilient cups 420. Reversible pneumatic motor 398 is then activated to rotate rotateable horizontal rod 390 through 180° to retract carriage 406 from its advanced position. Pressurized gas is thereafter supplied to nonmagnetic cylinder 404 to drive carriage 406 over an empty cantilevered arm 426 at welded belt conveyor station 422 (Y). The vacuum supplied to resilient cups 420 is terminated (X) to drop the welded belt onto cantilevered arm 426 and pressurized gas is thereafter supplied to nonmagnetic cylinder 404 to return carriage 406 to its home position. Electric motor 428 is then activated to convey the welded belt away and to move another cantilevered arm 426 into position for removal of the next welded belt from belt discharge station 15. As with the other stations, the creation and removal of a partial vacuum and the supplying of pressurized gas are accomplished by programmable controller 56 which actuates suitable valves in valve and switch cluster 54 (see FIG. 1). Similarly, programmable controller 56 activates switches in the valve and switch cluster 54 to activate electric motors.

FIGS. 16 through 25 are simplified schematic diagrams illustrating some of the steps involved in the preparation of welded belts in accordance with this apparatus and process of this invention.

Figure 16:
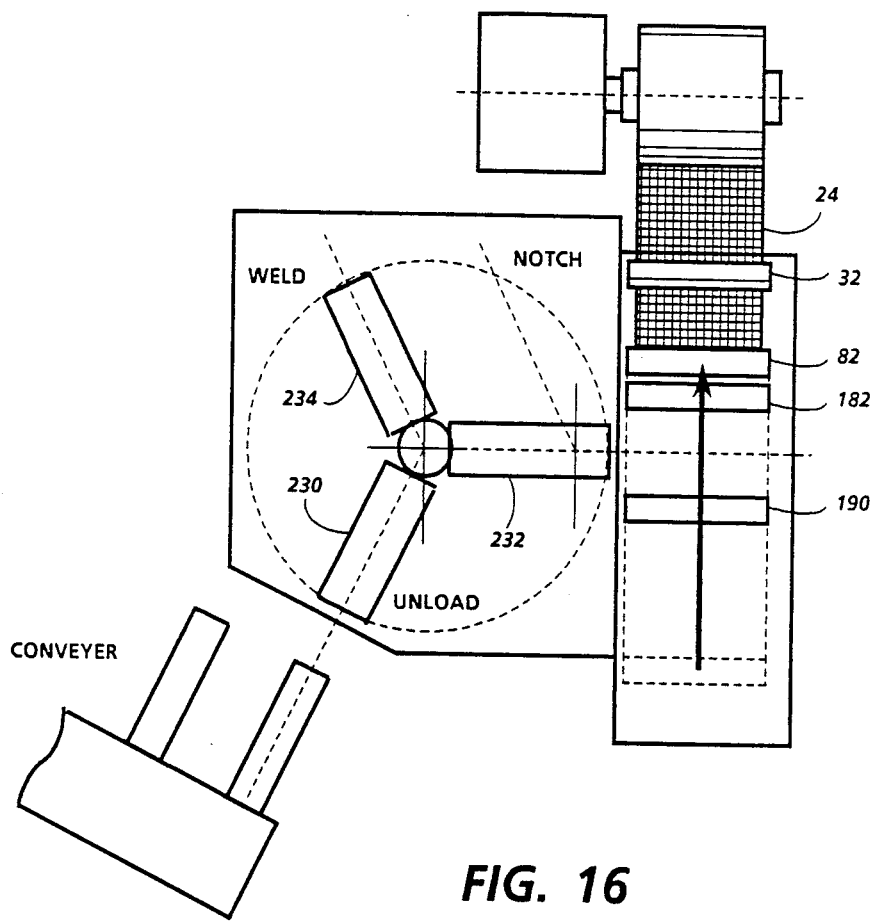
FIGS. 16 through 25 are simplified schematic, section views of a belt loop forming station and reciprocateable belt conveying system during different stages of the belt loop forming operation.
Figure 17:
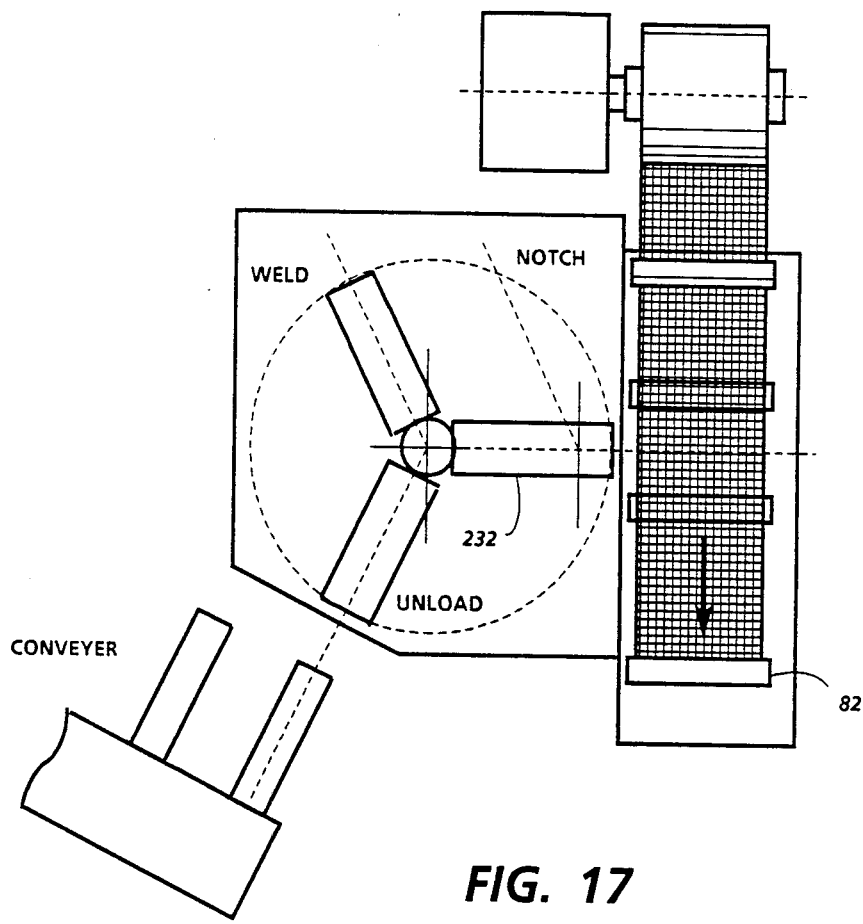

Referring to FIG. 16, vacuum shoe 82 is initially at a retracted home position over web 24. Dancer roll 32 compensates for any tendency of slack to form in web 24 when vacuum shoe 82 is in the home position and also assists in maintaining web 24 under tension during the web loop forming operation. The upwardly facing surfaces of vacuum shoes 182 and 190 are at about the same plane as the upwardly facing surface of web receiving platform. Vacuum shoe 82 grips the leading edge of web 24 and advances the desired length of web 24 past the cutting edge located on the downstream edge of the web receiving platform it to the cutting position as shown in FIG. 17 (also represented by phantom lines in FIG. 16).

Figure 18:
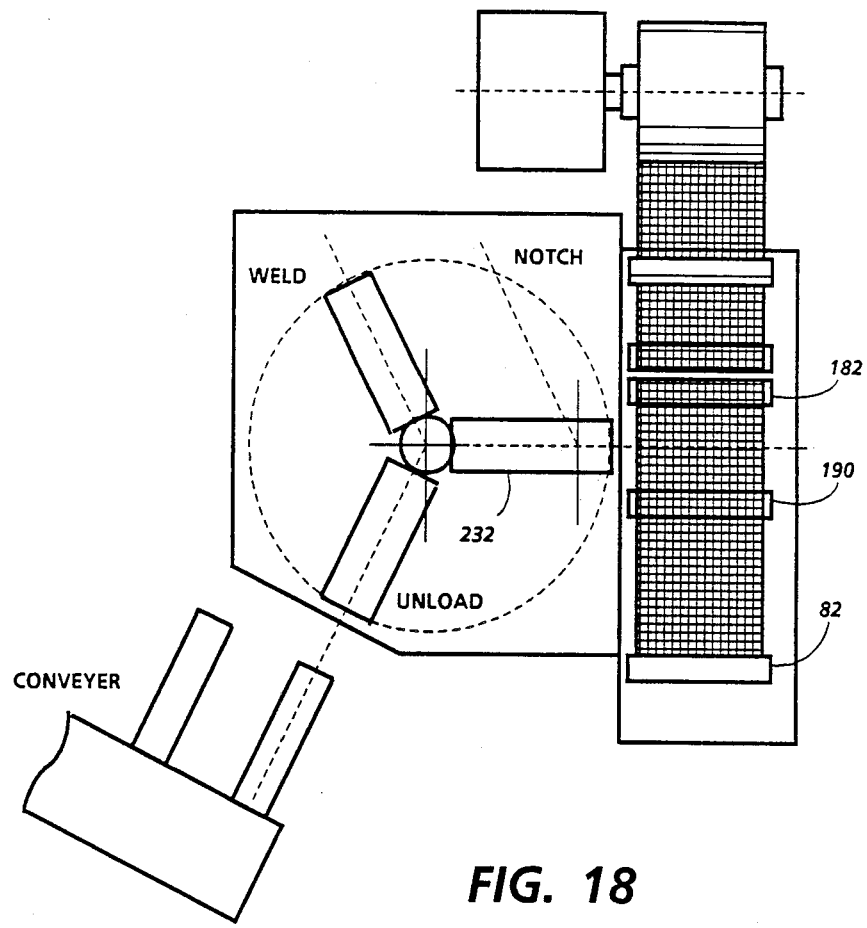
Figure 19:
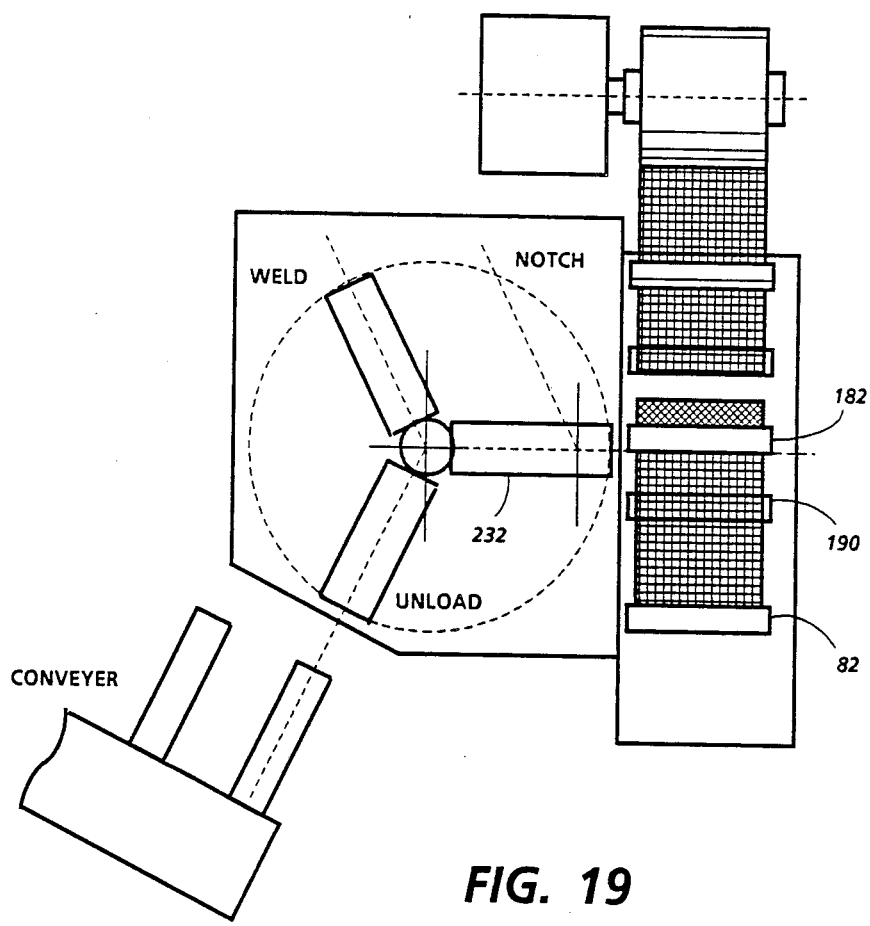

A cutting blade (not shown) severs web 24 along cutting edge 48 and then back to its home position to form a web segment illustrated in FIG. 18. Vacuum shoe 182 grips the lower surface of the trailing edge of the newly formed web segment and inverts it so that the lower surface of the trailing edge faces upwardly as shown in FIG. 19.

Figure 20:
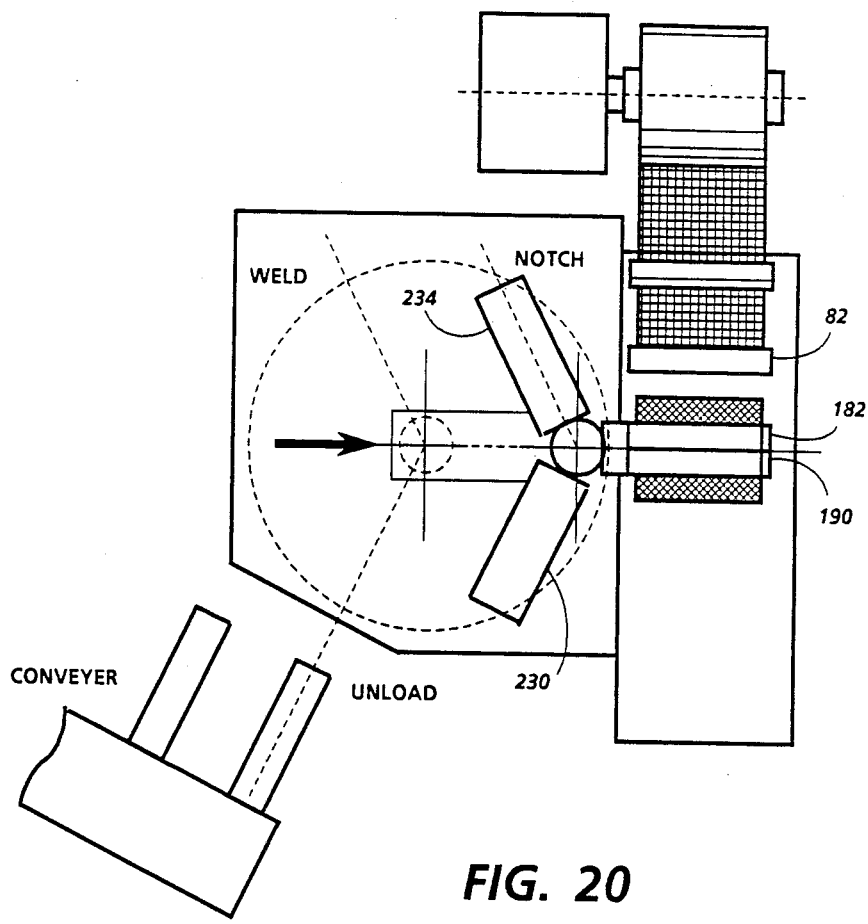

Vacuum shoe 82 is retracted to a position over vacuum shoe 190 and the leading edge of web 24 is transferred to vacuum shoe 190. Vacuum shoe 182 is returned to its original upwardly facing position to allow vacuum shoe 82 to be retracted to its home position. Vacuum shoe 82 is retracted to its home position and anvil 232 is indexed in a linear direction into position under vacuum shoes 182 and 190. Vacuum shoe 182 around shaft again inverts the trailing edge of the web segment and brings the trailing edge into contact with the upper surface of anvil 232. Vacuum shoe 190 inverts the leading edge to form a belt loop having a lap joint in which the leading edge overlaps the trailing edge. The newly formed belt loop is transferred to the upper surface of anvil 232. The relative positions of the vacuum shoes and anvil at this stage to the belt loop fabrication process is illustrated in FIG. 20.

Figure 21:
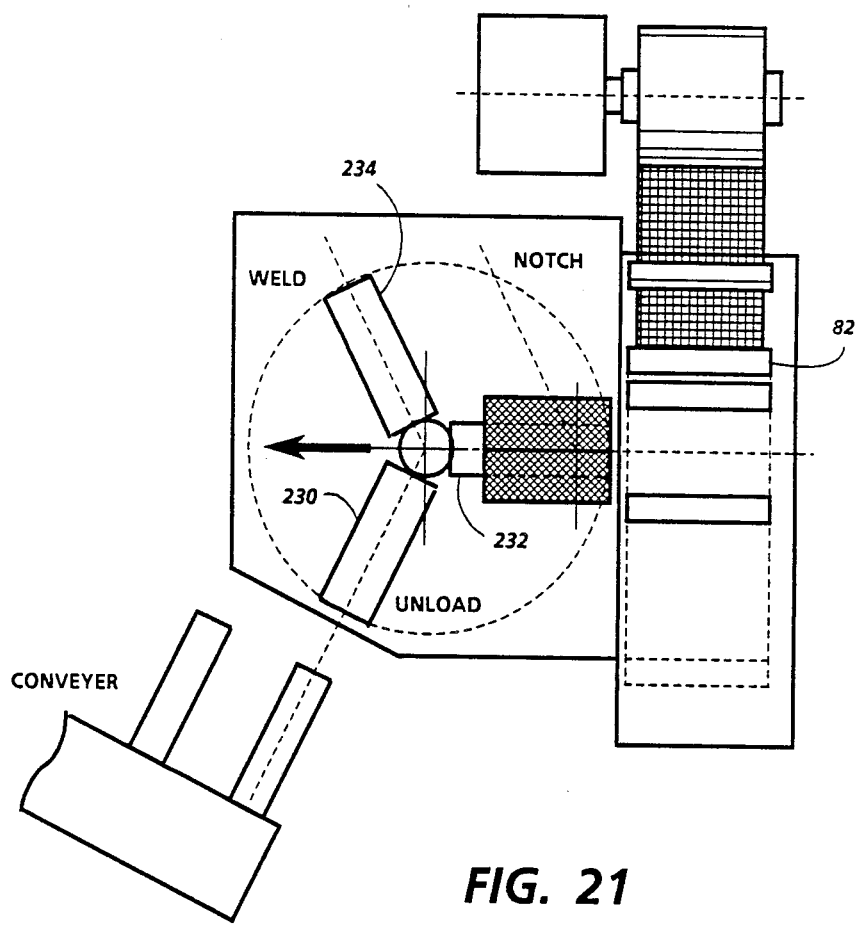

Vacuum shoes 182 and 190 are lifted for clearance purposes as anvil 232 and the transferred belt loop are retracted in a linear direction away from the belt loop forming station 10 as shown in FIG. 21. After anvil 232 has cleared, vacuum shoes 182 and 190 are then lowered and returned to their upwardly facing positions.

Figure 22:
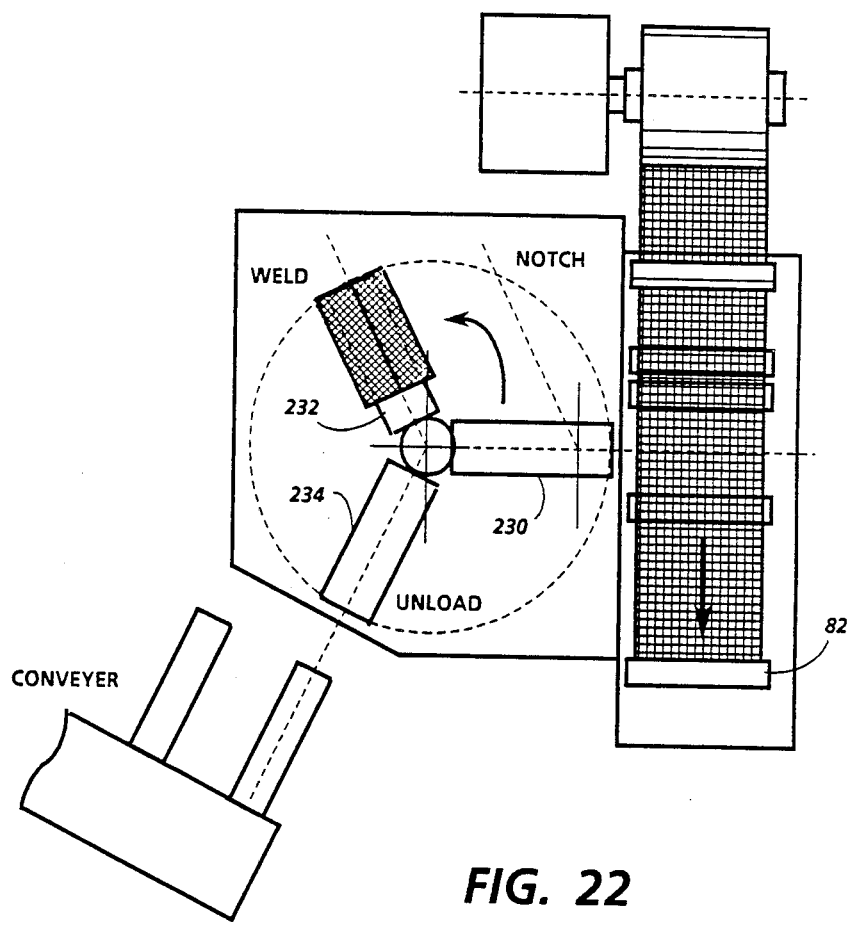

Referring to FIG. 22, the dial table is rotated 120° to convey the newly formed belt loop carried on anvil 232 to the belt welding station.

Figure 23:
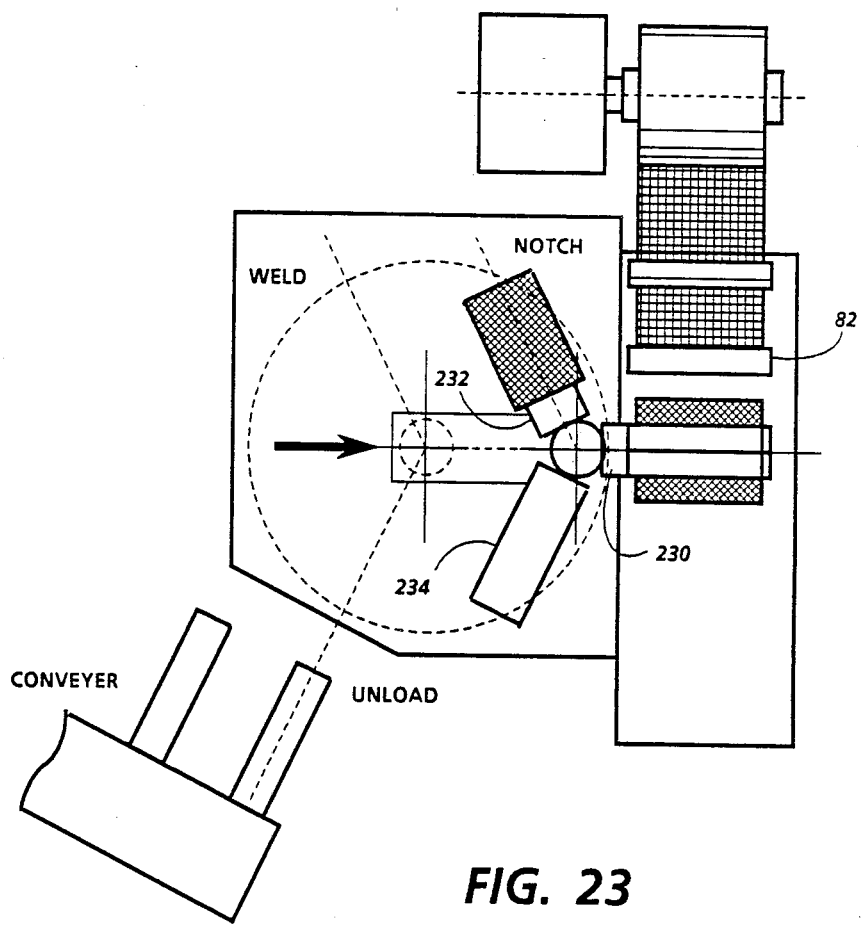

Subsequent to welding of the belt lap joint, anvil 232 and the welded belt loop are advanced to a belt notching station and another empty anvil 230 is simultaneously advanced in a linear path into the belt loop forming station as shown in FIG. 23.

Figure 24:
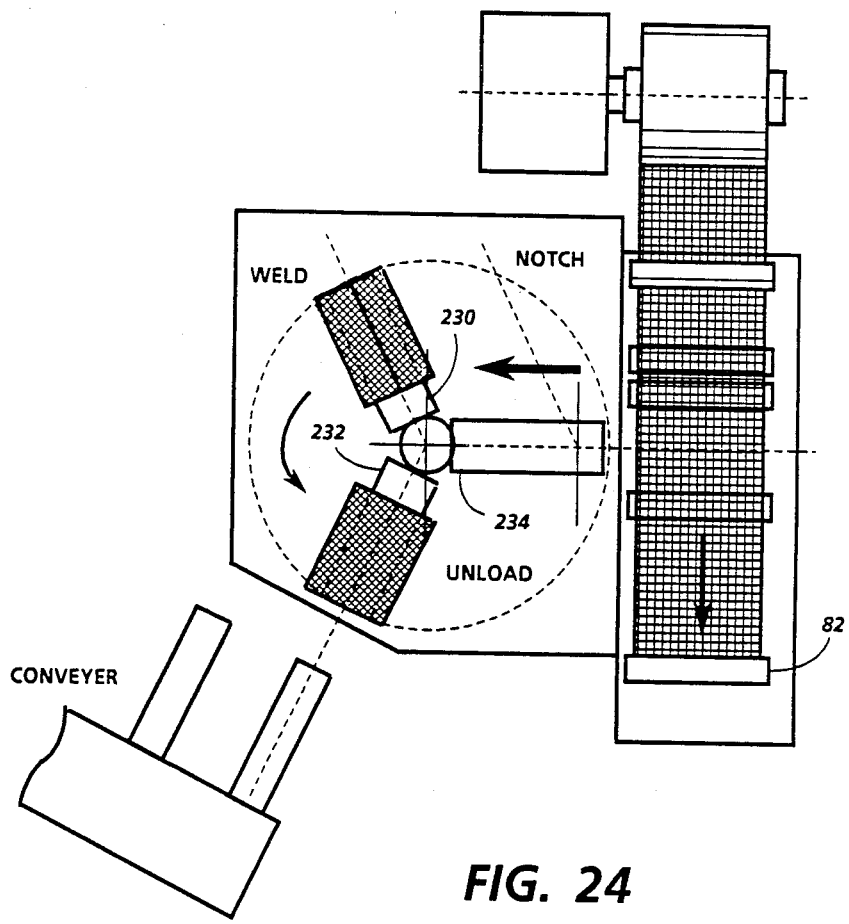

In FIG. 24, anvil 232 and the notched belt loop are retracted in a linear direction away from the belt notching station and anvil 234 carrying a newly transferred belt loop is retracted in a linear direction away from the belt loop forming station. The dial table is rotated 120° to convey the newly formed belt loop carried on anvil 230 to the belt welding station and the notched belt on anvil 232 to the belt discharge station. And an empty anvil 234 is advanced to a preloading position from the belt discharge station.

Figure 25:
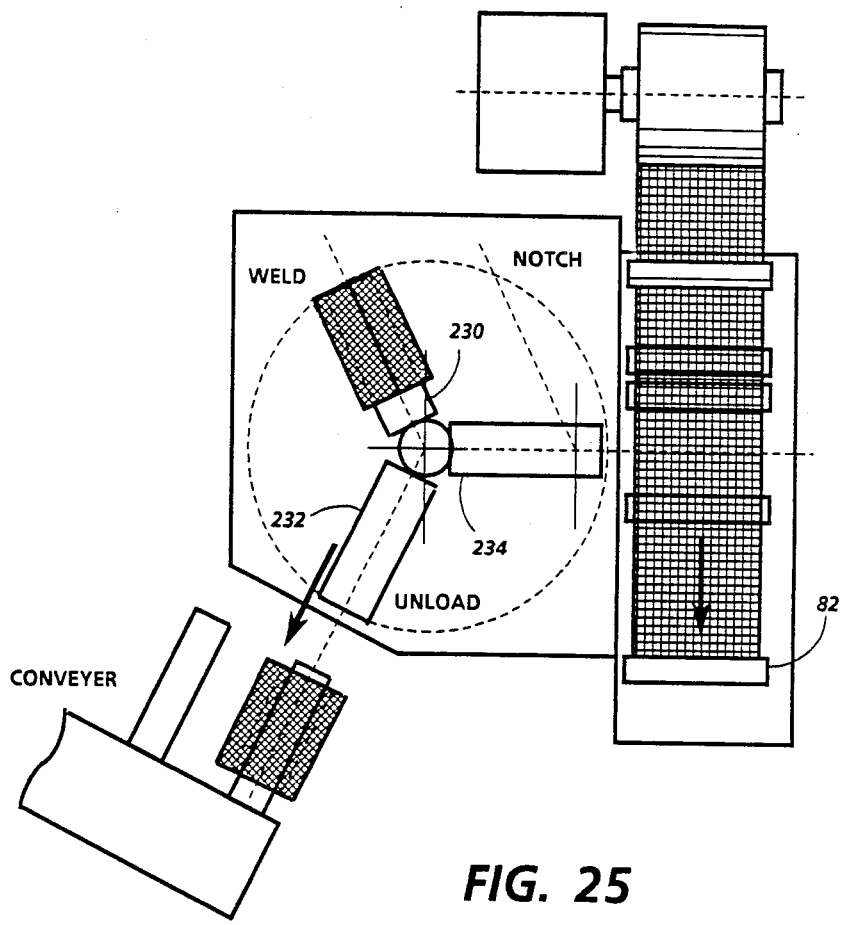

Referring to FIG. 25, the welded and notched belt loop carried on anvil 232 is removed from anvil 232 at the belt discharge station.

Although this apparatus and process has been described with reference to the formation of a belt on an anvil as it progressed from belt loop forming station to belt welding station, belt notching station and finally to belt discharge station, it should be understood that other belts are simultaneously being processed on or removed from identical anvils at the other stations. In a less desirable alternative embodiment which normally requires more space, the anvils may be transported in a noncircular path from one station to the next. For example, the stations may be located in a single row with the anvils being routed in a loop from the last station to the first station. In this less preferred embodiment, the axis of each anvil is preferably aligned substantially perpendicular to the path along which each anvil is transported. This simplifies alignment of the anvils at each station without undue positioning of the apparatus at each station to accommodate the arrival of a fresh anvil.

Any suitable thin, flexible web comprising a thermoplastic layer may be used in the apparatus and process of this invention. The web may comprise a single layer or a plurality of layers in which at least one of the layers comprises thermoplastic material. any suitable thermoplastic, polymeric material which will melt at the temperatures generated at the contiguous overlapping web surfaces of the seam may be utilized. Typical thermoplastic, polymeric materials include polyethylenes, polypropylenes, polycarbonates, polyvinylacetate, terephthalic acid resins, polyvinylchloride, styrene-butadiene coploymers and the like. The thermoplastic material that is induced to melt and weld the seam may be provided solely by a thermoplastic coating on the web, from both a coating and a web substrate, or solely from the web itself. Thus, for example, a nonthermoplastic coating on the web, from both a coating and a web substrate, or solely from the web, itself. Thus, for example, a nonthermoplastic web substrate may be coated with a thermoplastic material which is the sole source of the material which melts. provided solely by a thermoplastic coating on the web, from both a coating and a web substrate, or solely from the web itself. Thus, for example, a nonthermoplastic web substrate may be coated with a thermoplastic material which is the sole source of the material which melts. Alternatively, for example, the web may be uncoated and consist entirely of the thermoplastic material, some of which melts to weld the seam. The web may be of any suitable thickness which will allow adequate heating of the contiguous overlapping surfaces of thew web edges to permit sufficient heat energy to be applied at the contiguous overlapping surfaces to cause the thermoplastic material to melt and weld the overlapping edges of web at the seam. Preferred web thicknesses for use with ultrasonic welding can range from between about 25 micrometers to about 0.5 millimeter. Thicker webs may be utilized as long as sufficient heat is applied to the contiguous overlapping surfaces of the web to cause the thermoplastic material to melt. Webs having a thickness up to about 10 millimeters may be joined with the process and apparatus of this invention.

In a specific example, a web of polyester film (Mylar, available from E. I. duPont de Nemours and Co.) having a width of about 41.4 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. This web was processed in an apparatus similar to the apparatus illustrated in the drawings. The leading edge of the web was fed over cylindrical air bearings from a supply roll over a support platform at a belt loop forming station. The end of the web was flush with the far cutting edge of the platform (relative to the location of the supply roll) as a result of shearing during a previous wrapping cycle. The end of the web was held to the far edge of the platform by a vacuum applied to apertures in the platform adjacent the end of the web. An anvil having a width of about 10 cm and a length of about 50 cm cantilevered from a rotatable stand was transported from a belt discharge station to the belt loop forming station by rotation of the stand. Upon arrival of the anvil at the belt forming station, a horizontally reciprocateable vacuum pick up arm having vacuum apertures was brought into contact with the upper surface of the leading edge of the web. The web was transferred from the platform to the vacuum pick arm by supplying a vacuum to the vacuum pick up arm and terminating the vacuum applied to apertures in the platform adjacent the end of the web. The web was pulled from the supply roll by advancing the vacuum pick up arm away from the cutting edge of the platform to the desired belt length of about 20–60 cm from the cutting edge. The belt passed over a pair of pivotable arms having a cross section resembling that of the clawed legs of a crab facing upwards except that upwardly facing vacuum shoes were positioned where claws would normally be located. One of the pivotable arms was adjacent to the cutting edge and the other was positioned downstream in the direction in which the web was pulled by the vacuum pick up arm. Vacuum was applied to the apertures in the platform and to the vacuum shoe on the pivotable arm closet to the platform (hereinafter referred to as arm A). The web was sheared a the cutting edge. The vacuum pick up arm was retracted slightly to move the leading edge of the web about two inches toward the cutting edge and arm A was pivoted to invert the vacuum shoe and cause the web to loop downward. The vacuum pick up arm then moved to the vacuum shoe on the downstream pivotable arm (hereinafter referred to as arm B) where the leading edge of the web is transferred by supplying vacuum to the vacuum shoe of arm B and terminating supply of vacuum to the vacuum pick up arm. Arm A is pivoted back to its original position and the vacuum pick up arm is returned to its home position upstream from the cutting edge. A rotary dial supporting three cantilevered welding anvils was moved with a linear motion to insert the free end of the one of the anvils between the arms A and B. A vacuum was applied to a pair of rows of apertures on each side of the centerline of the inserted anvil. Arms A and B are then pivoted to invert their vacuum shes against the upper surface of the inserted anvil and cause the web to droop downwardly to form a loop. The vacuum supplied to the shoes carried by arms A and B was terminated to effect transfer of the belt loop to the anvil. Arms A and B were then retracted sufficiently to provide clearance for anvil removal. A linear movement in a direction along the axis of the anvil toward the stand was imparted to the anvil to remove the belt loop and anvil from the belt loop forming station. Once the free end of the mandrel bearing the newly formed belt loop cleared the belt loop forming apparatus, it was advanced by the rotatable stand to a belt welding station. The vacuum previously applied to the rows of apertures on the anvil was maintained during advancement of the belt loop to the welding station. While the anvil with the newly formed belt loop was being advanced to the belt welding station, an anvil bearing a welded and notched belt was simultaneously indexed toward a belt discharge station and a fresh mandrel was indexed to a position aligned for subsequent entry into the belt lop forming station. Upon arrival at the welding station, an ultrasonic welding horn supported in a carriage was lowered against the web lap joint. The horn was biased against the seam due to the controlled weight of about 2.5 kilograms of horn, transducer, bracket and any counterweight pressing against the seam supported by the mandrel. The horn had a flat input horn welding surface about 12 millimeters long and about 0.04 to 0.1 centimeter wide, was operated at a frequency of 20 kHz and a motion amplitude of abut 76 micrometers. The horn was transported by the carriage in a substantially horizontal path along the web lap joint at a rate of about 5 centimeters per second. During welding, the horn was allowed to freely move vertically to accommodate variations in the web lap joint thickness. This welding produce caused the thermoplastic materials in the web to uniformly melt and weld the web seam. Upon completion of the welding of the belt lap joint, the ultrasonic welding horn was raised away from the web lap joint to a retracted position.

When the newly formed belt loop arrived at the belt welding station, a welded and notched belt simultaneously arrived at the discharge station, the vacuum applied to the rows of apertures on the anvil is terminated, and four resilient vacuum cups supported in a row on a carriage were lowered against the welded lap joint of the web belt. A vacuum was supplied to the resilient vacuum cups and the vacuum applied to the anvil apertures was terminated. The resilient vacuum cups were then raised to lift the upper surface of the welded belt away from the upper surface of anvil. The carriage supporting the resilient vacuum cups and the welded belt was thereafter transported horizontally away from the free end of the anvil thereby conveying the welded belt away for further processing.

The anvil with the belt welded at the belt welding station was advanced by the rotatable stand in a linear direction to a notching station. The vacuum applied previously to the apertures on the anvil was maintained. While the anvil bearing the welded belt was being advanced to the notching station, fresh anvil from the belt discharge station was simultaneously advanced into the belt loop forming station.

During continued operation of the belt making process, defective sections of the web were encountered a the belt loop forming station. These undesirable sections were automatically separated (culled) from quality portions of the web by detecting bar codes previously applied to the edge of the web prior to during or after coating of the web. These predetermined defect maps based on the bar code reference marks on the web indicating defective sections of thew web were detected with a sensors, such as a reader available from Scopescan, positioned at the web receiving platform of the belt loop forming station over the path of the bar codes. When the scanner detected a bar code that had previously been identified as indicating the location of a defect, the detection signal was transmitted to a Allen Bradley Programmable Controller, Model No. 2/05 or Model No. 2/17. This programmable Controller was previously programmed to switch to a rejection mode when a defect detection signal was received from the reader to cause the pick are to pull out a short overhang length to web past the cutting edge and return to its home position to thereafter pull the web overhang material to rotating nip rollers that thereafter removed the defective segment of the web. The web was sheared and the leading edge of a fresh web free of defects was in position at the cutting edge for the initiation of a normal belt forming cycle. The rotatable and reciprocateable stand bearing the cantilevered anvils remained stationary during the culling operation.

To prepare a photoreceptor belt having a width of about 30–45 cm and an inside circumference of about 20–60 cm, the same anvil described above having a width of about 10 cm and a length of about 50 cm was used again with only a minor adjustment to the programable controller accommodate the change by having the vacuum pick up arm draw the leading edge of the web past the cutting edge a distance of 60 cm instead of 20 cm.

The apparatus and process of this invention continuously shapes, cuts and welds webs into belts in less time without duplicate manual handling. Further, the marked reduction of manual handling decreases the likelihood of damage to sensitive substrates or coatings, particularly for coated substrates that demand precision tolerances such as flexible organic photoreceptors for high speed electrostatographic copiers, duplicators, printers and the like. For example, for photoreceptor belts, even the presence of human fingerprints or scratches will render the belt unsuitable for electrophotgraphic copiers, duplicators and printers. Moreover the apparatus of this invention occupies less floor space and minimizes the equipment needed for alignment, cutting, welding trimming and other processing of the webs and belts. In addition, the apparatus and process of this invention achieve greater uniform belt conicity and uniform quality. Also, because of differencs in belt size requirements for different electrostatographic copiers, duplicators, printers and the like, the apparatus of this invention can be rapidly and easily converted from fabricating a belt of one diameter or width to preparing a belt of a different diameter or width. Moreover, the characteristics of belt fabrication systems of this invention exhibit are capable of rapidly manufacturing belts of different widths and diameters within precise tolerance standards.

Although the invention has been described with reference to specific preferred embodiments, it is not intended to be limited thereto rather those skilled in the art will recognize that variations and modifications may be made therein which are within the spirit of the invention and within the scope of the claims.

What is claimed is:

1. A process for fabricating belts comprising conveying the leading edge of a web from a supply roll into a belt loop forming station, cutting said web a predetermined distance from said leading edge to form a web segment having said leading edge at one end and a trailing edge at the opposite end, gripping only the lower surface of said web adajcent said leading edge, gripping only the lower surface of said web adjacent said trailing edge, inverting said lower surface of said web adjacent said leading edge, inverting said lower surface of said web adjacent said trailing edge, overlapping said leading edge and said trailing edge to form a loop of said web segment loosely suspended from the joint formed by the overlapped leading edge and trailing edge, transferring said loop of said web segment at said belt loop forming station to a first anvil, conveying said loop of said web segment on said first anvil to a welding station while maintaining said joint formed by said overlapped leading edge and trailing edge imparting a linear movement and a rotary movement to said first anvil while conveying said loop to said welding station, simultaneously conveying another anvil to said belt loop forming station, welding said overlapped leading edge and trailing edge together on said anvil to form a belt welded at said joint, and simultaneously forming another loop from a fresh web segment at said belt loop forming station.

2. A process for fabricating belts comprising conveying the leading edge of a web from a supply roll into a belt loop forming station, cutting said web a predetermined distance from said leading edge to form a web segment having said leading edge at one end and a trailing edge at the opposite end, gripping only the lower surface of said web adjacent said leading edge, gripping only the lower surface of said web adjacent said trailing edge, inverting said lower surface of said web adjacent said leading edge, inverting said ower surface of said web adjacent said trailing edge, overlapping said leading edge and said trailing edge to form a loop of said web segment loosely suspended from the joint formed by the overlapped leading edge and trailing edge, transferring said loop of said web segment at said belt loop forming station to an anvil, conveying said loop of said web segment on said anvil to a welding station while maintaining said joint formed by said overlapped leading edge and trailing edge and welding said overlapped leading edge and trailing edge together on said anvil to form a belt welded at said joint.

3. A process according to claim 2 including altering the sequence of overlapping the trailing edge and leading edge of said web in previous cycles at said belt loop forming station whereby the edge previously underneath the other edge is thereafter over the other edge.

4. A process according to claim 2 including forming a partial vacuum in a gripper to grip said lower surface of said web adjacent said leading edge and forming a partial vacuum in a gripper to grip said lower surface of said web adjacent said trailing edge.

5. A process according to claim 2 including maintaining a partial vacuum in said anvil to retain on said anvil the lower surface of said joint formed by said overlapped leading edge and trailing edge.

6. A process according to claim 2 including altering said predetermined distance thereby cutting said web at a different predetermined distance from said leading edge to form a web segment having a different length between said leading edge and said trailing edge.

7. A process according to claim 2 including conveying an anvil bearing a belt welded at said joint to a discharge station, gripping said joint, lifting said belt away from said anvil, and conveying said belt substantially horizontally away from aid anvil.

8. A process according to claim 2 including providing three anvils, each anvil having an elongated arm with one free end and one supported end, centrally supporting the supported ends of said three anvils, the free ends of each elongated arm extending outwardly from the centrally supported end and being substantially equidistant from the free ends of the two adjacent elongated arms, and imparting rotary movement and linear movement to said three anvils.

9. A process according to claim 8 including imparting a rotary and a linear movement to said three anvils while conveying a belt on one of said anvils from said welding station to a belt notching station while simultaneously conveying another of said anvils to said belt forming station.

10. A process according to claim 8 including imparting a rotary and a linear movement to said three anvils while conveying said welded belt on an anvil from said belt notching station to said discharge station while simultaneously conveying another anvil from said belt loop forming station to said welding station.

11. A process according to claim 2 including conveying an anvil bearing said belt welded at said joint to a notching station to remove weld flashings at each end of said joint and substantially simultaneously conveying a second anvil to said belt loop forming station to receive a fresh loop of said web segment.

12. A process according to claim 11 including conveying an anvil bearing said belt from said notching station to a discharge station and removing said unitary belt from one end of the anvil and substantially simultaneously conveying said second anvil and said fresh loop of said web segment from said belt loop forming station to said welding station.

13. A process according to claim 12 including imparting a linear movement and a rotary movement to the anvils while conveying a belt on an anvil from said belt notching station to said discharge station and while simultaneously conveying another anvil from said belt loop forming station to said welding station.

* * * * *